Feb. 13, 1968  E. H. LEEDY  3,368,324
PACKAGING APPARATUS
Original Filed Dec. 9, 1963  17 Sheets-Sheet 3
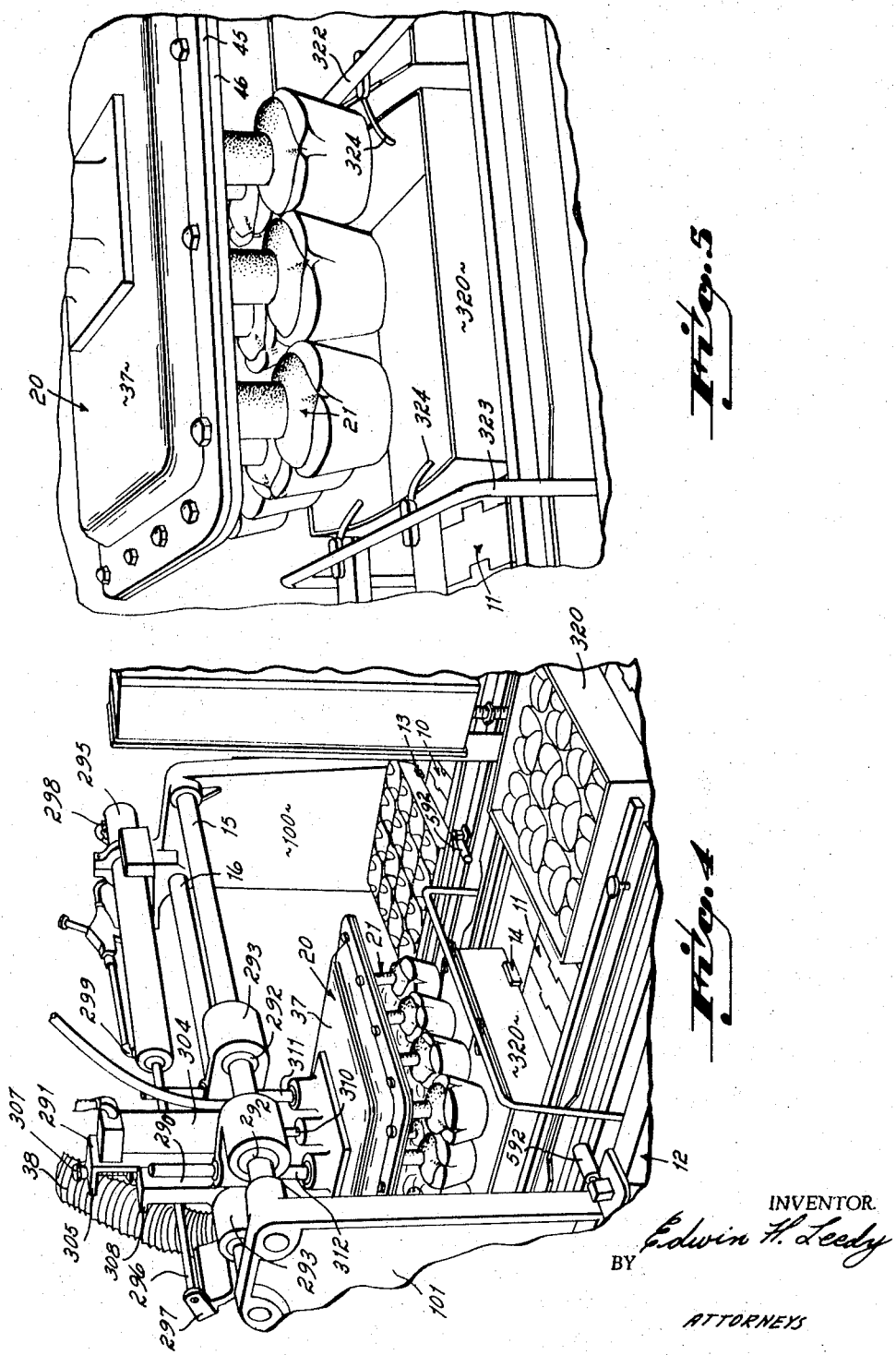
INVENTOR.
Edwin H. Leedy
BY
ATTORNEYS

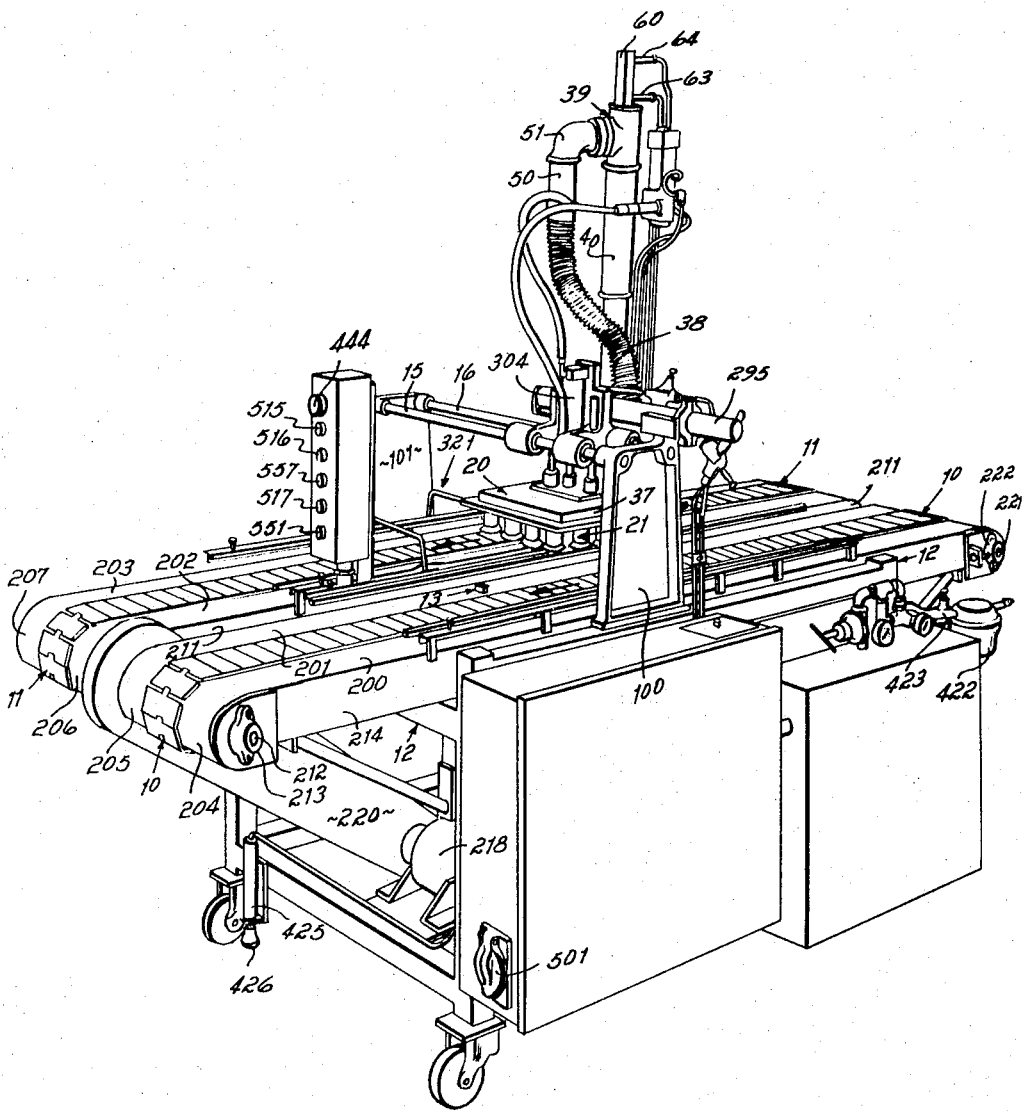

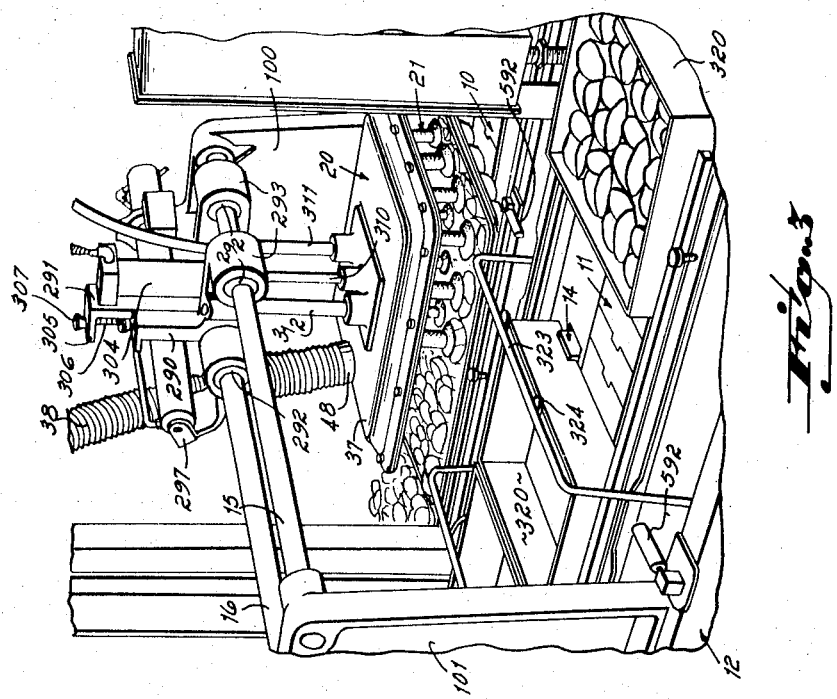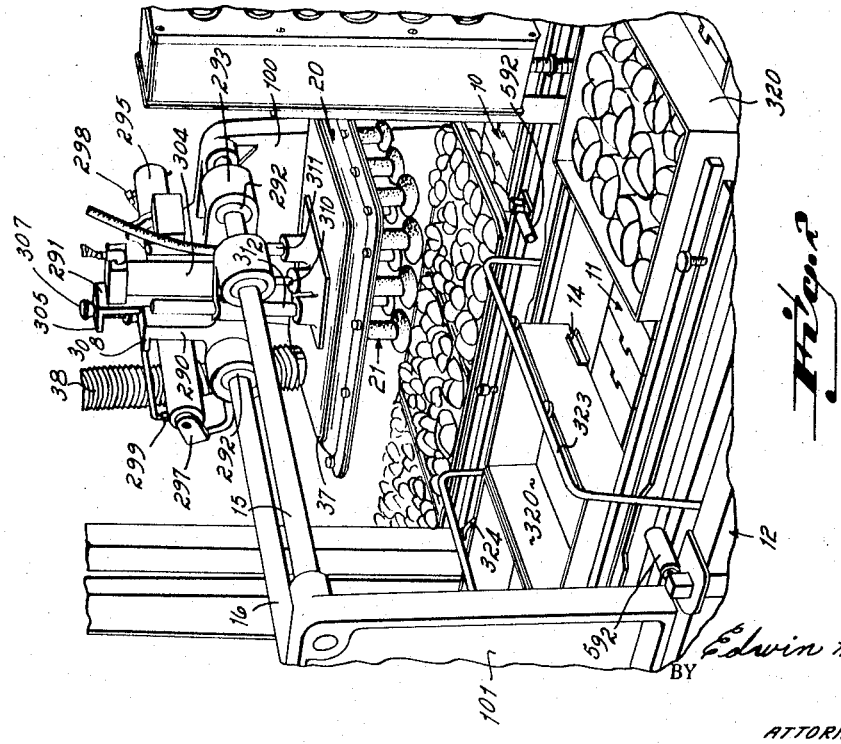

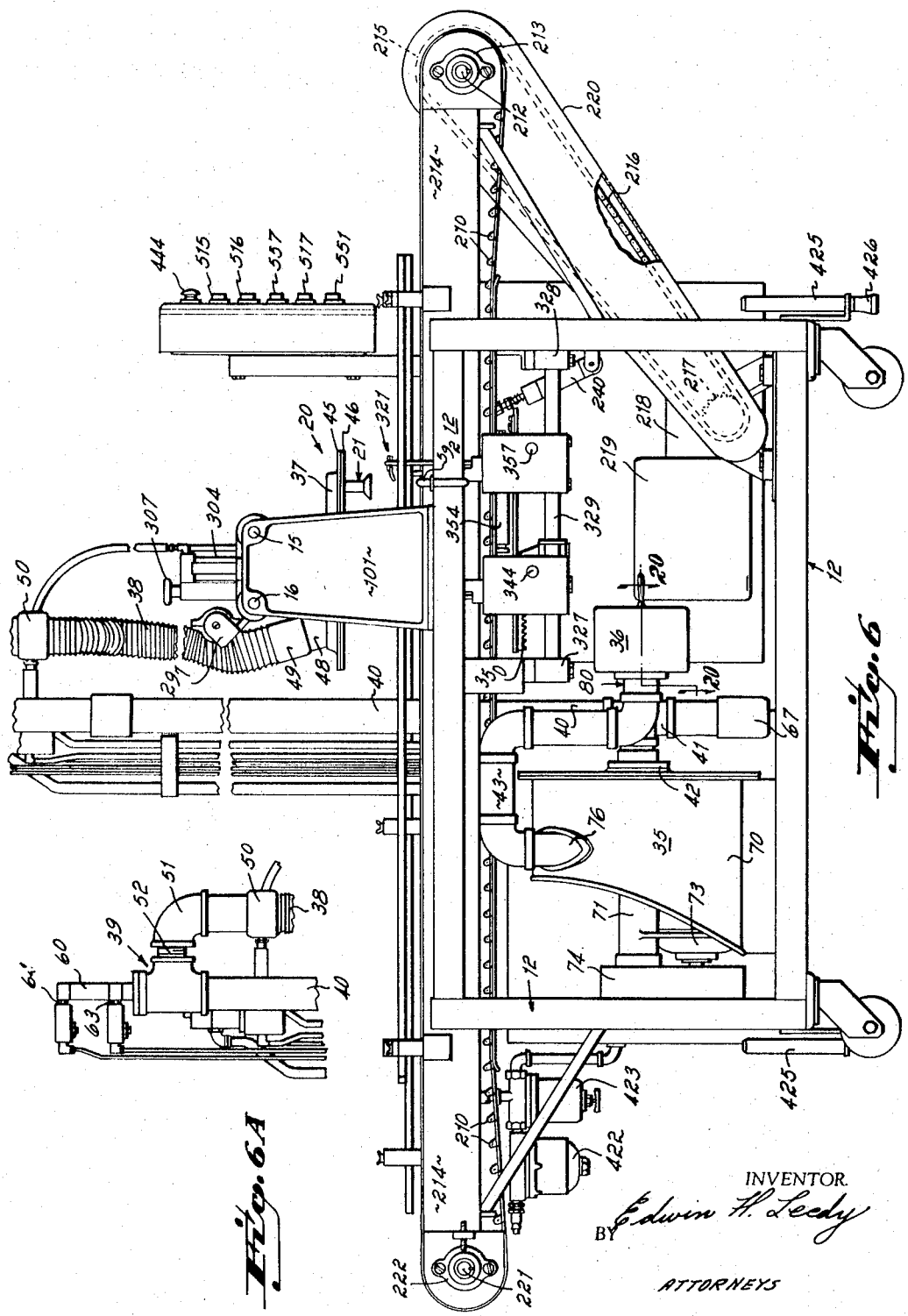

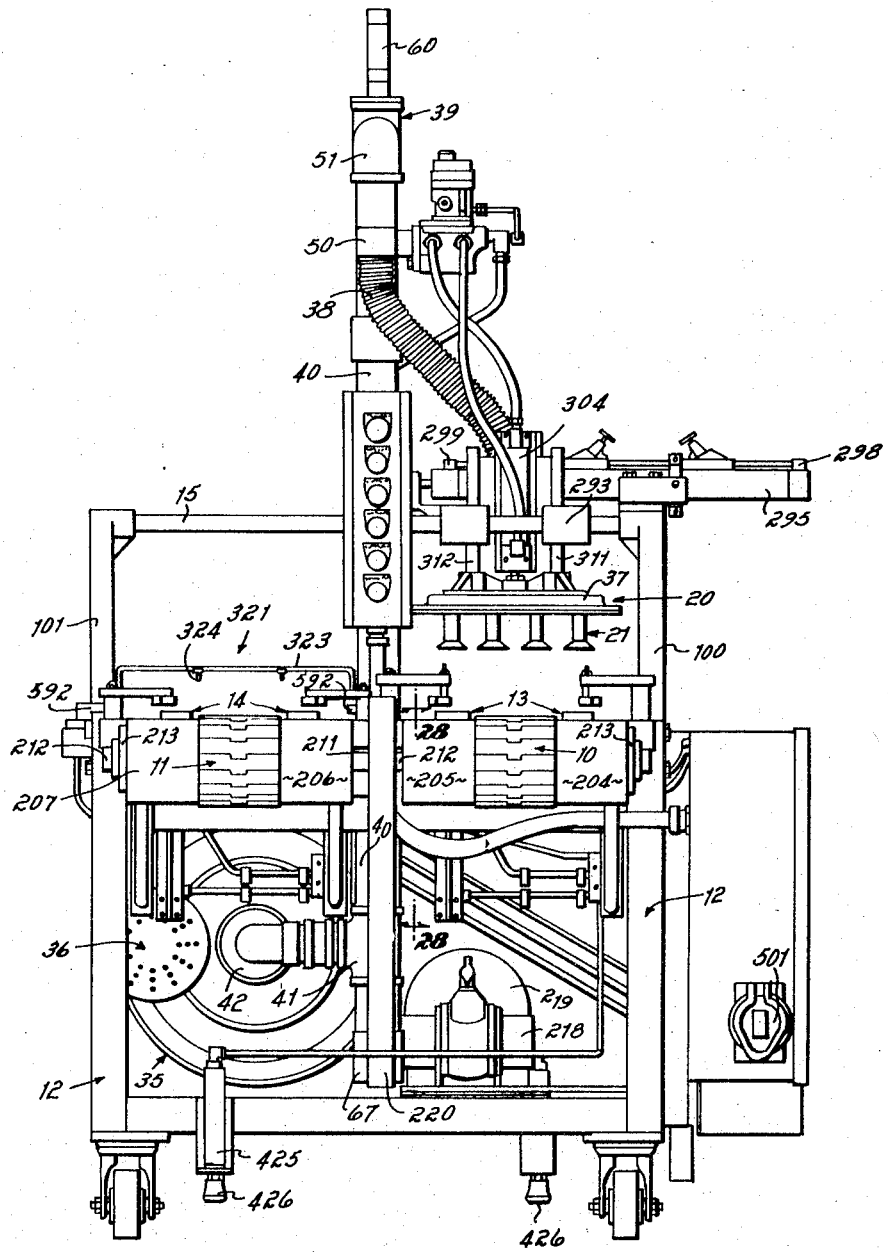

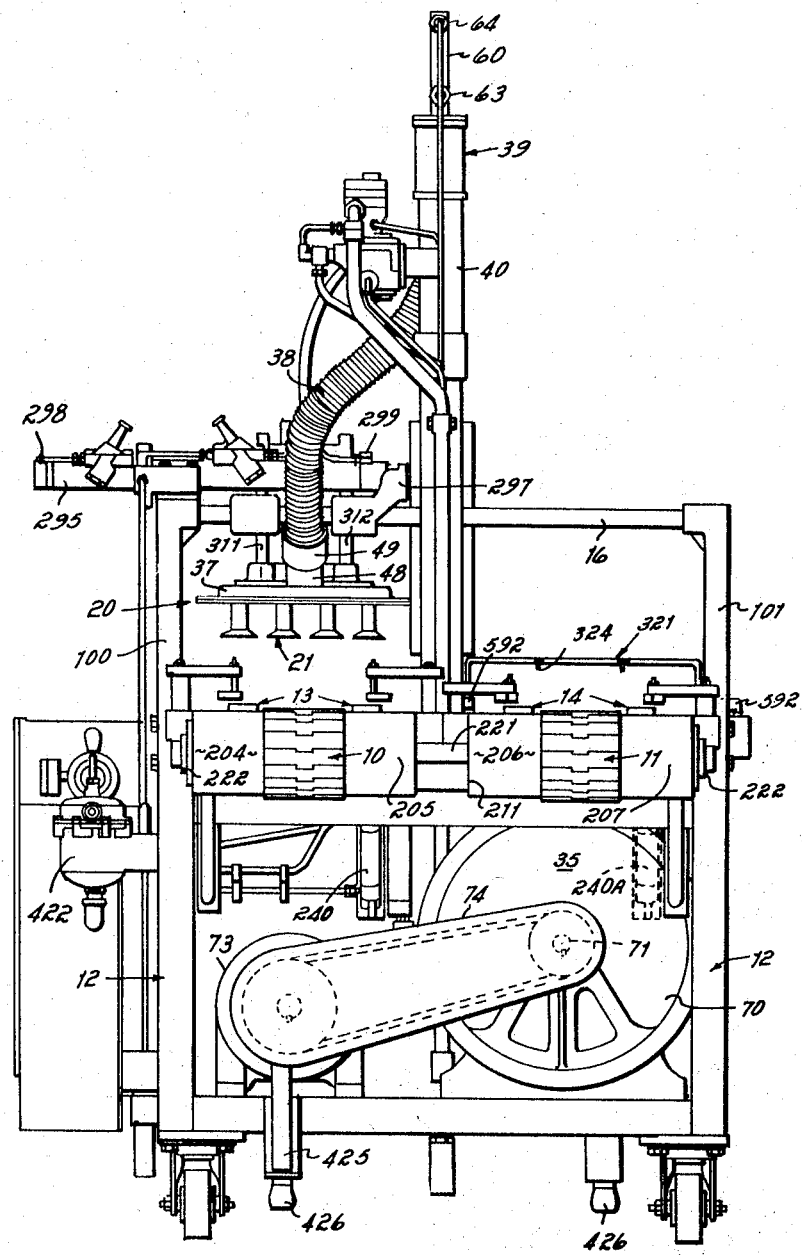

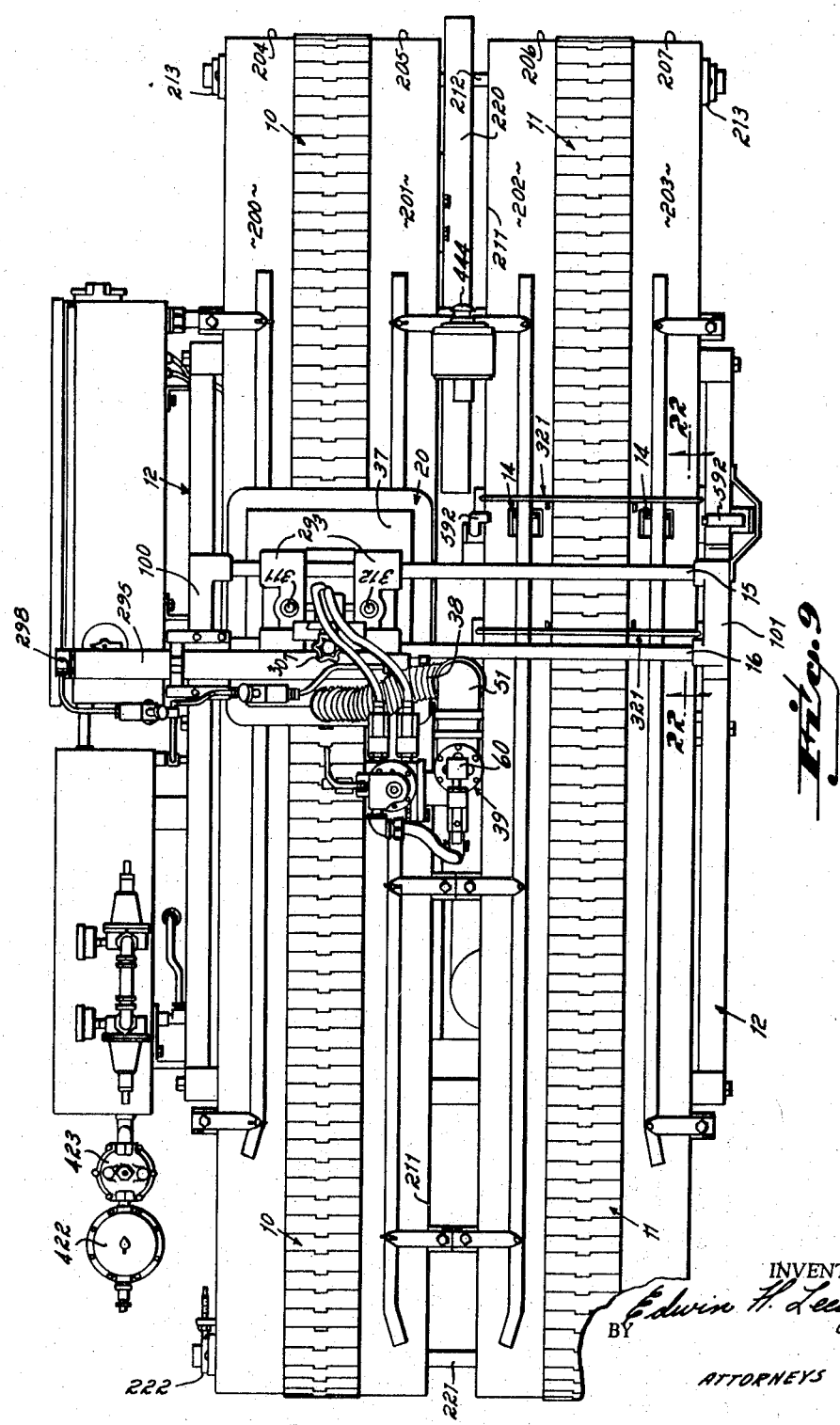

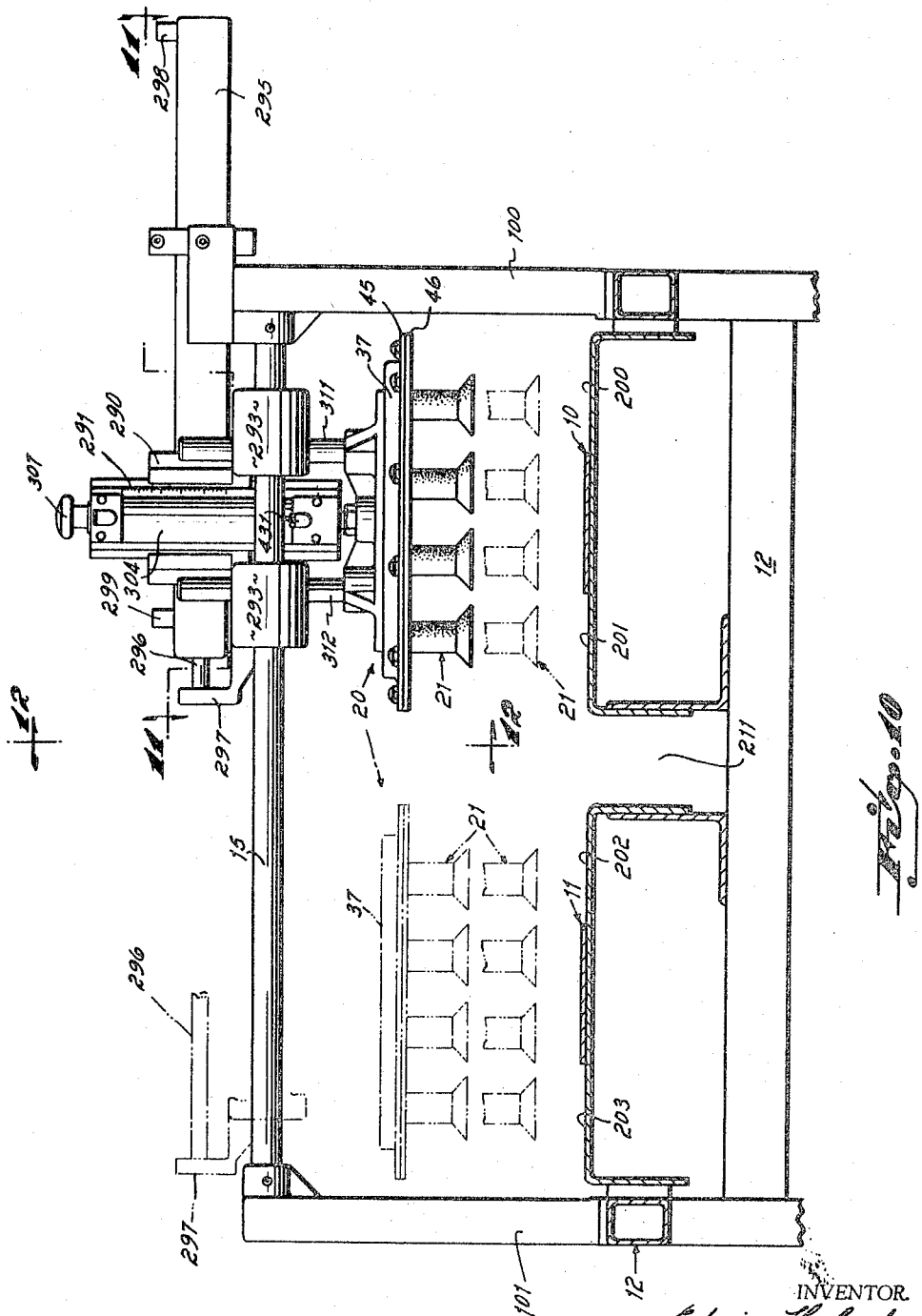

Feb. 13, 1968    E. H. LEEDY    3,368,324
PACKAGING APPARATUS
Original Filed Dec. 9, 1963    17 Sheets-Sheet 9
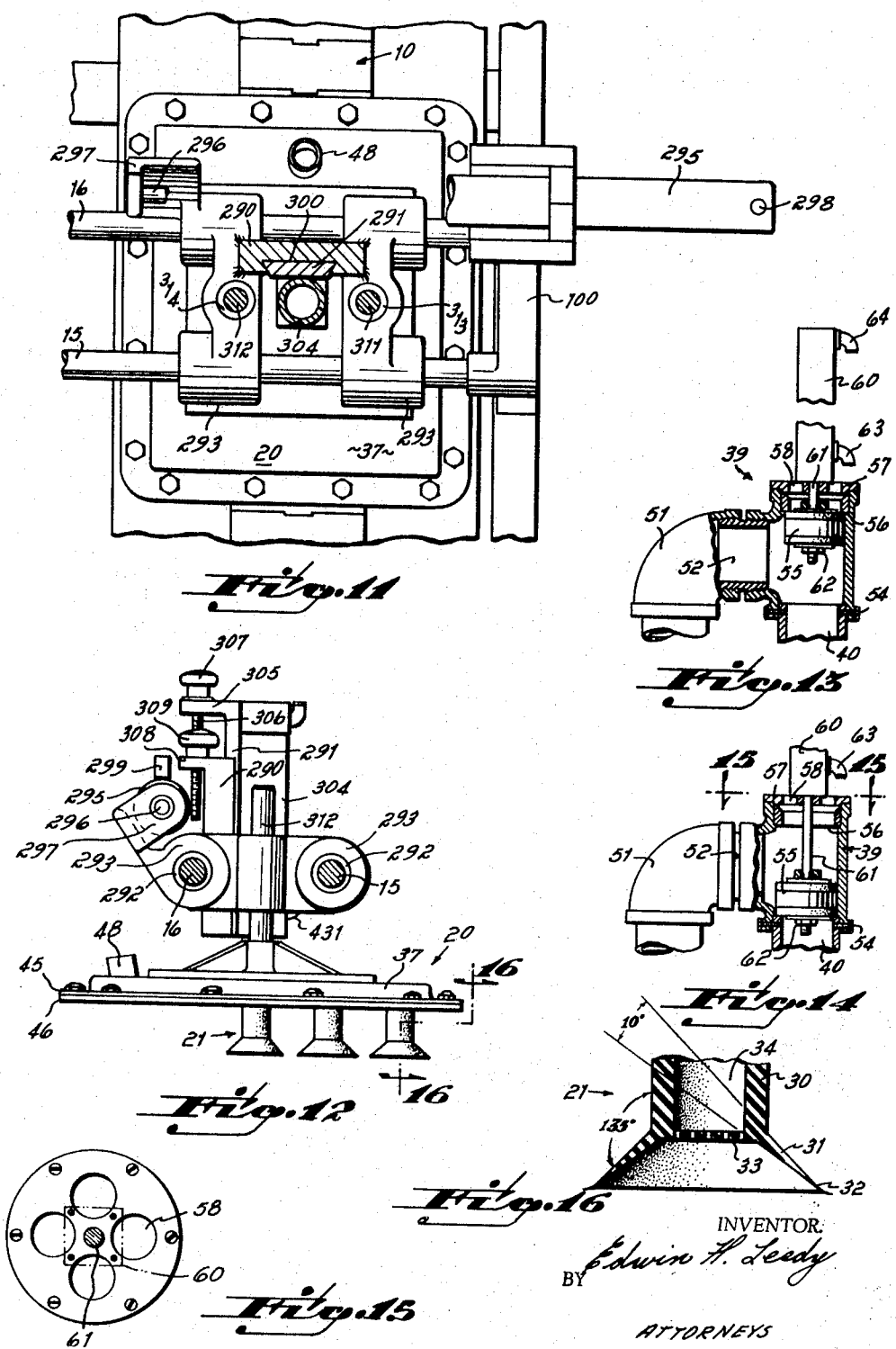

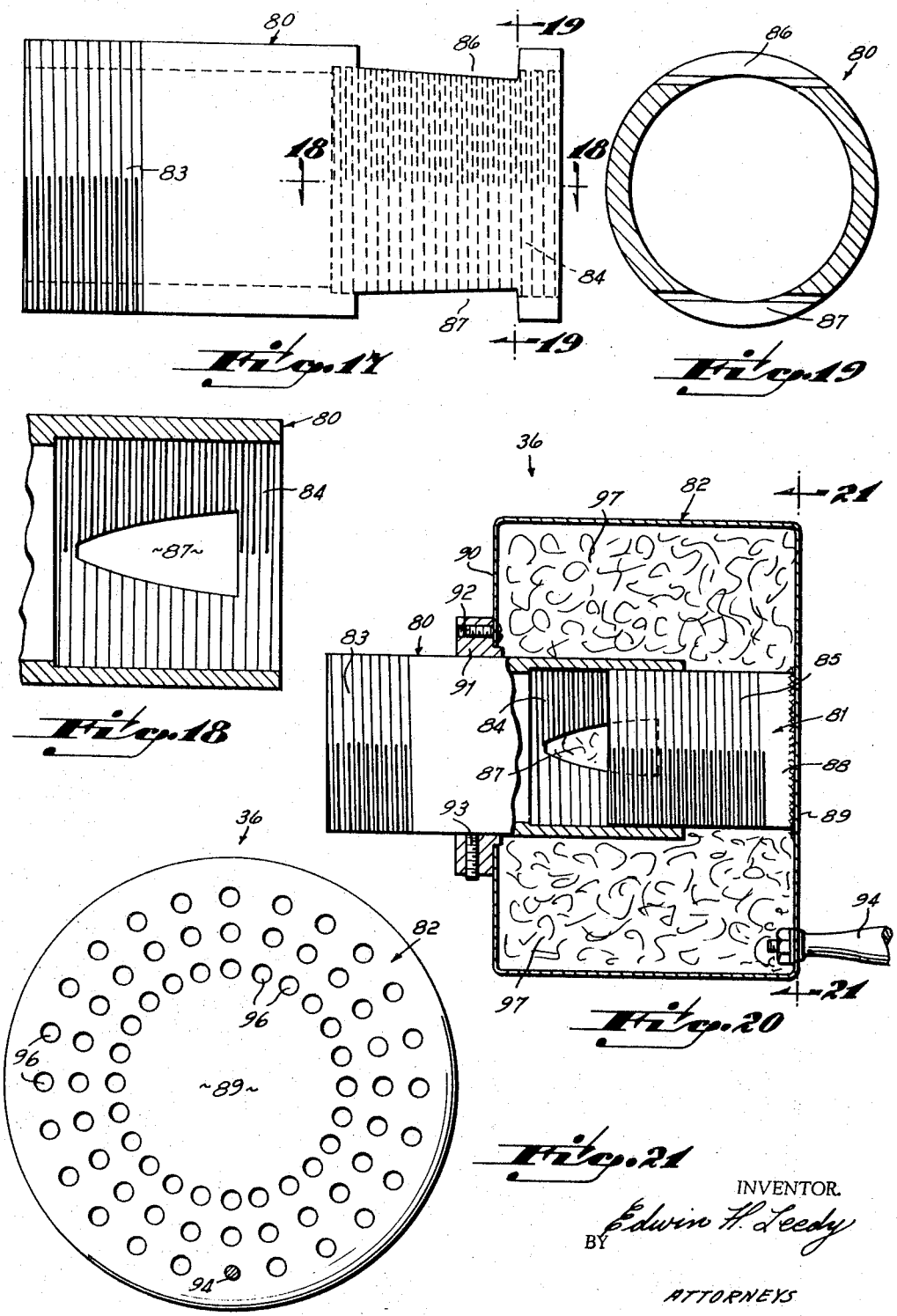

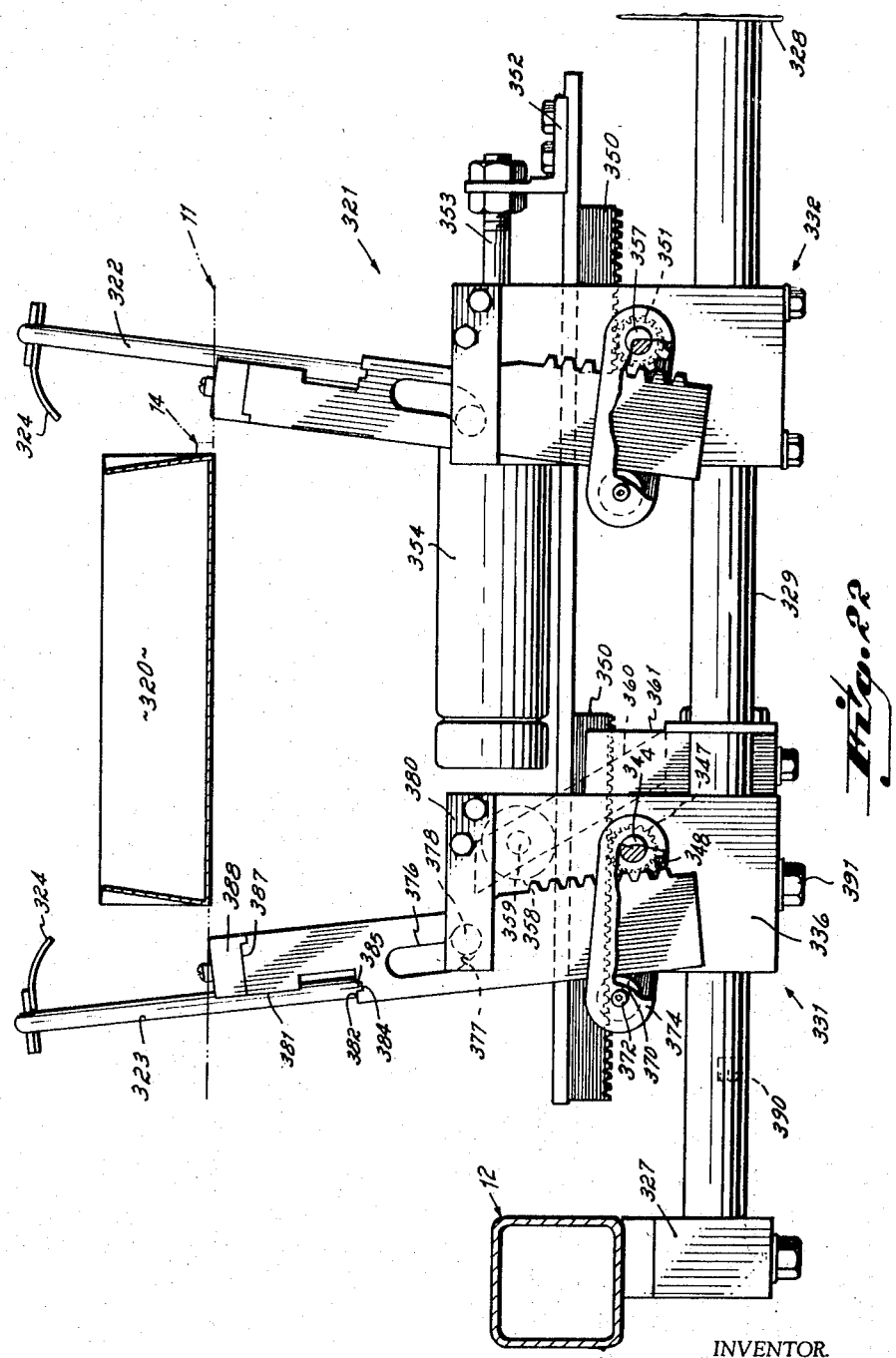

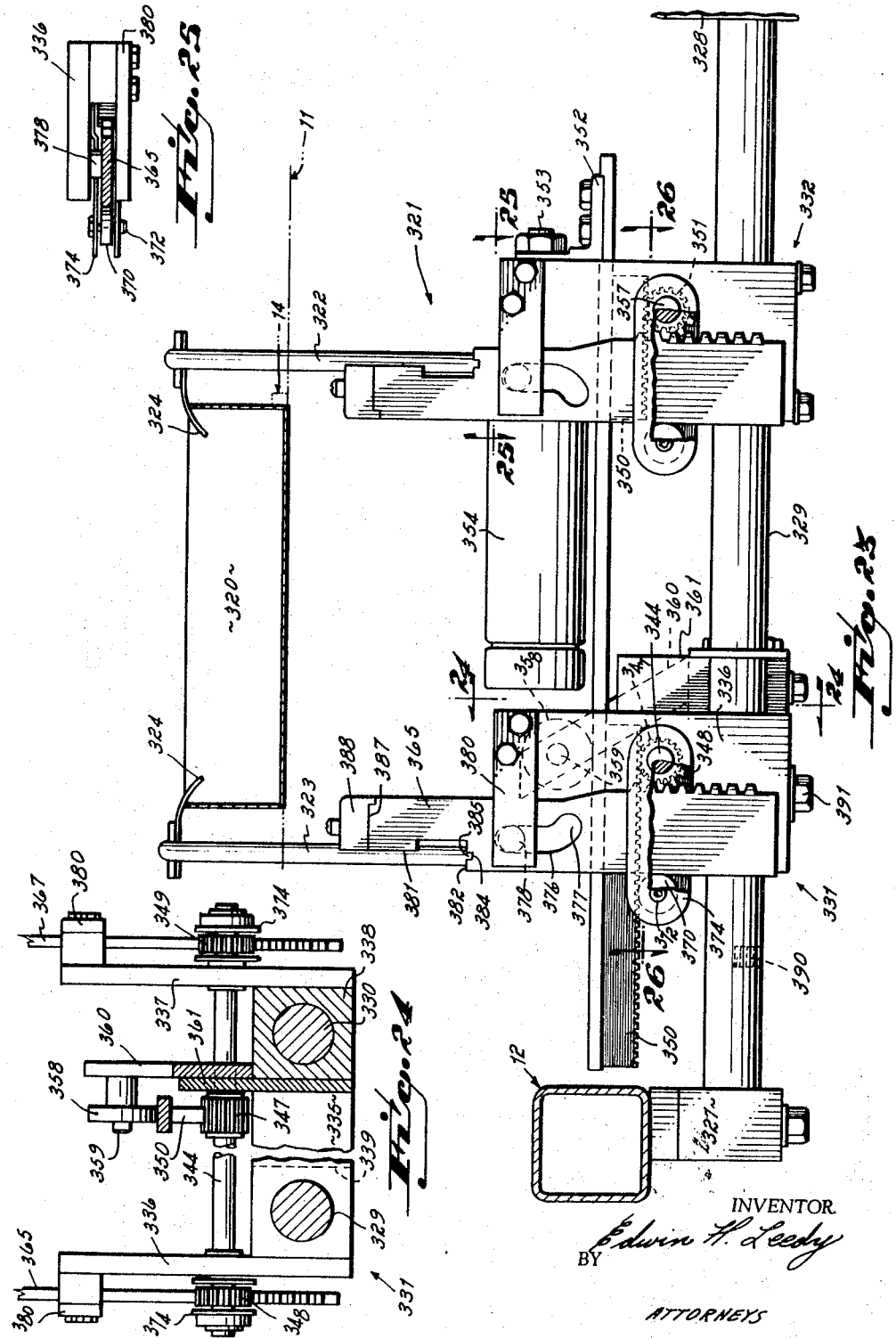

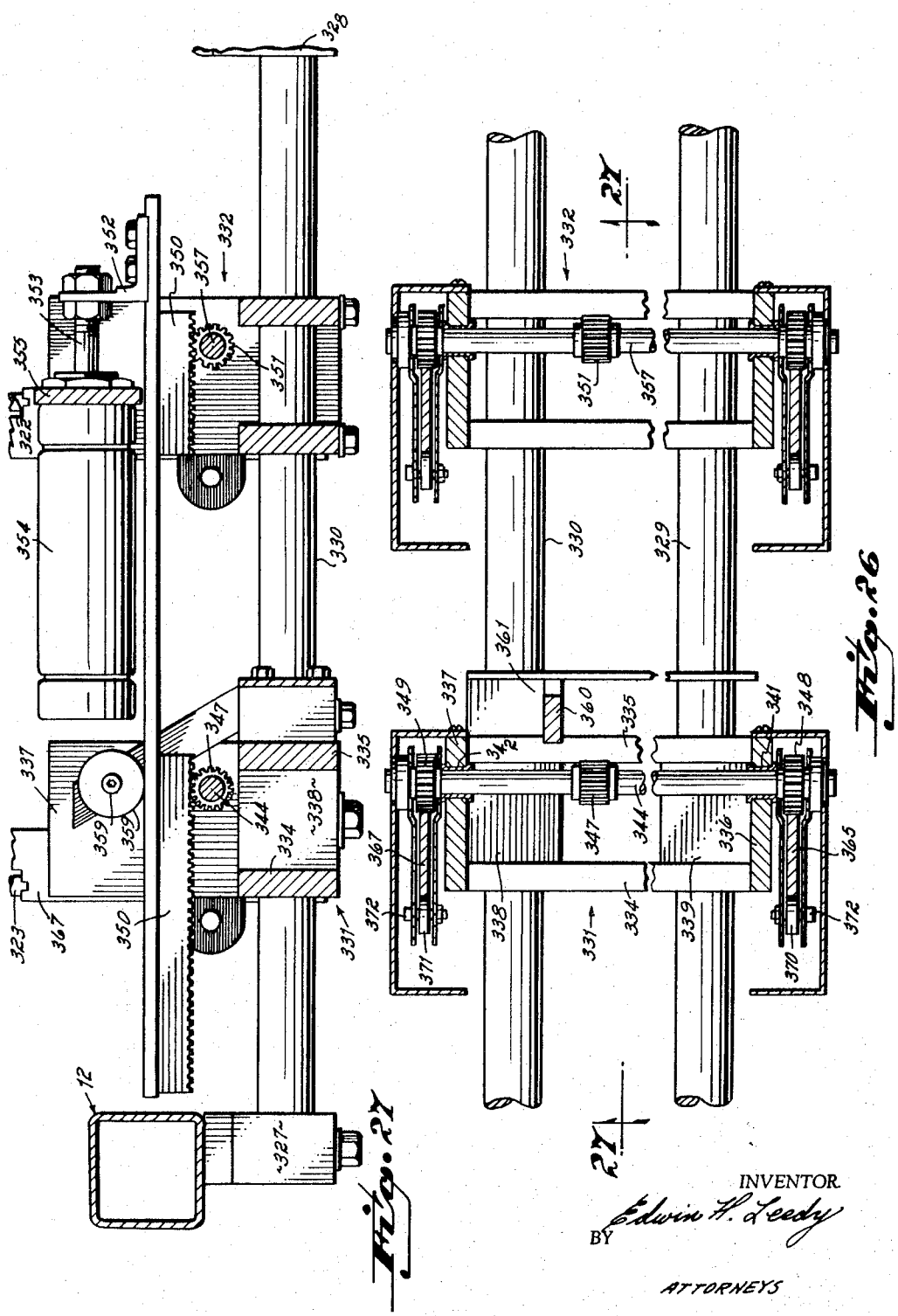

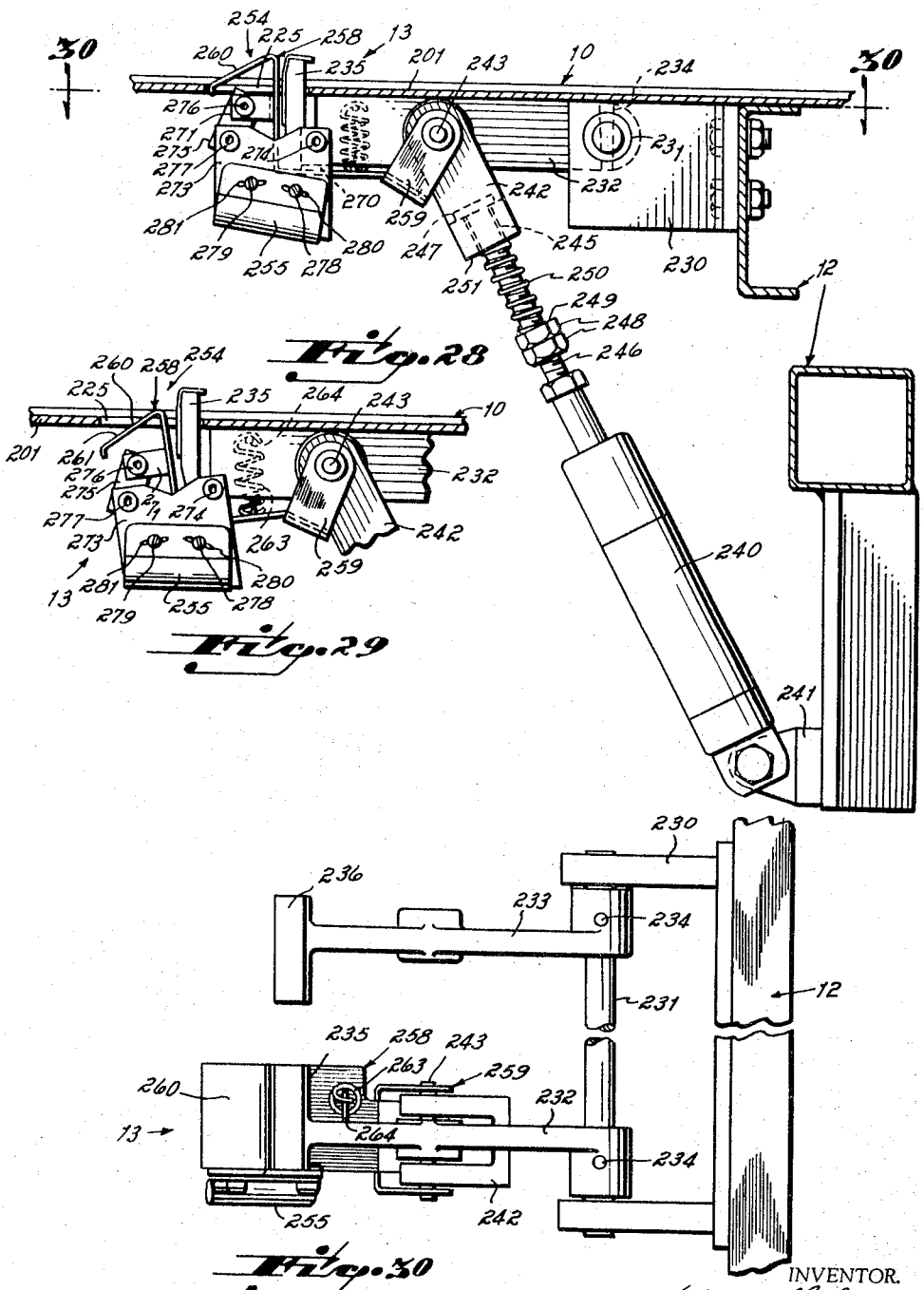

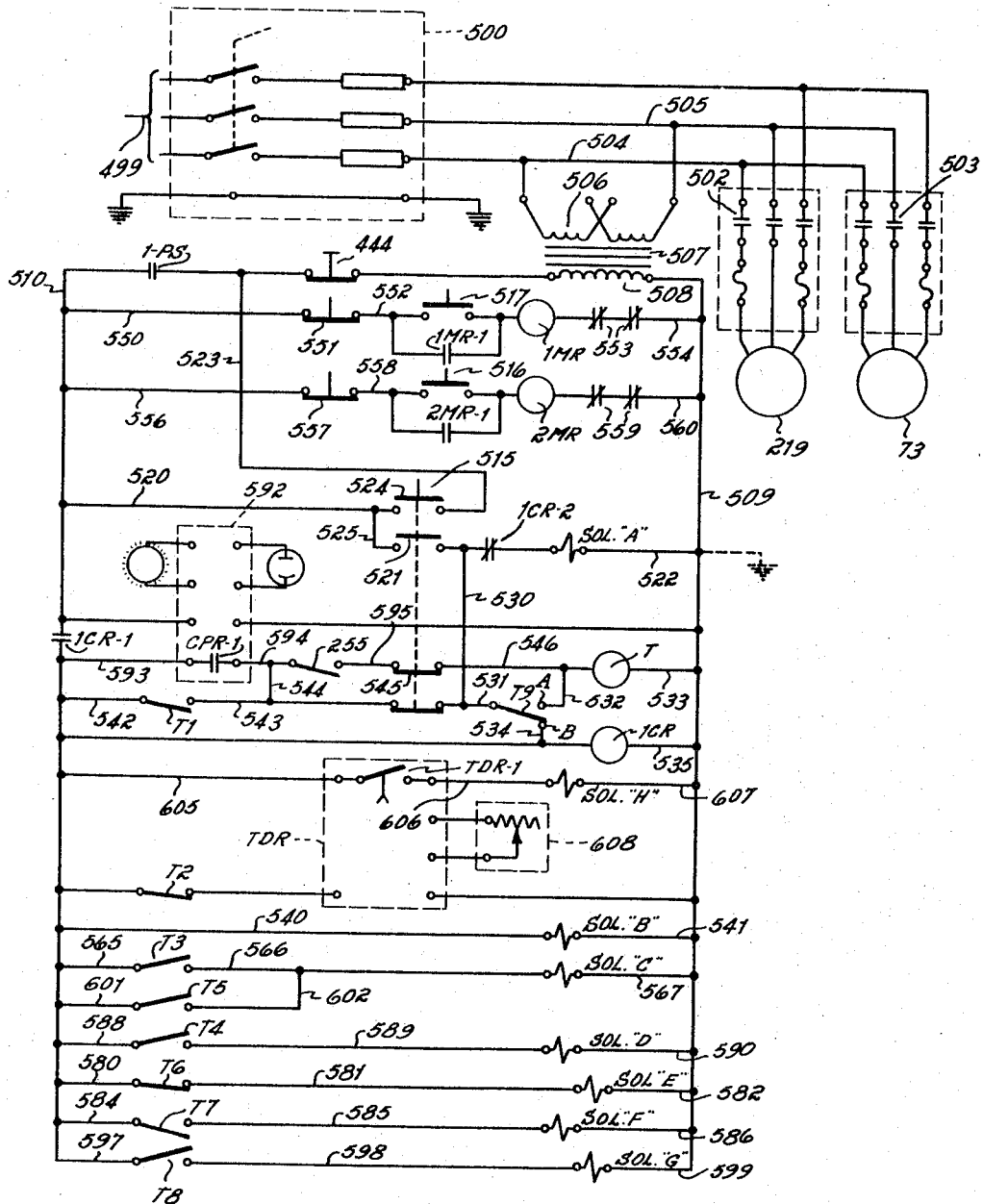

Feb. 13, 1968      E. H. LEEDY      3,368,324

PACKAGING APPARATUS

Original Filed Dec. 9, 1963      17 Sheets-Sheet 16

INVENTOR.
Edwin H. Leedy
BY

ATTORNEYS

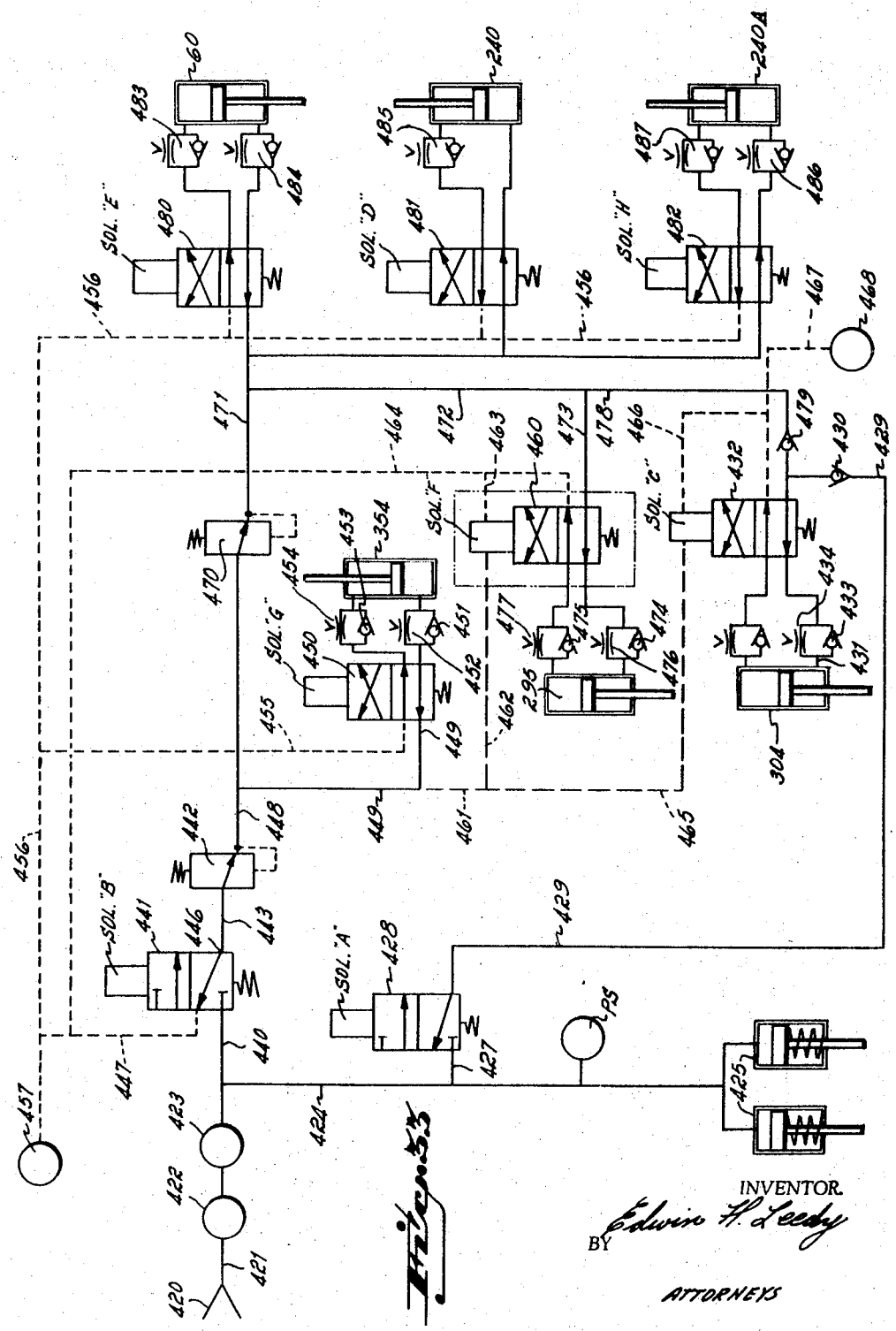

United States Patent Office 3,368,324
Patented Feb. 13, 1968

3,368,324
PACKAGING APPARATUS
Edwin H. Leedy, Chicago, Ill., assignor, by mesne assignments, to Lockwood Manufacturing Company, a corporation of Delaware
Original application Dec. 9, 1963, Ser. No. 328,967, now Patent No. 3,288,088, dated Nov. 29, 1966. Divided and this application June 23, 1966, Ser. No. 559,895
8 Claims. (Cl. 53—247)

This application is a division of application Ser. No. 328,967, filed Dec. 9, 1963, now U.S. Patent No. 3,288,-088 assigned to Lockwood Manufacturing Co.

This invention relates to apparatus for packaging bakery goods and more particularly to a machine for automatically removing a multiplicity of baked rolls and cakes from a pan in which they were baked and for placing them in the container in which they are to be distributed to the ultimate consumer. It is within the scope of this invention to automatically depan and package numerous types of baked rolls and cakes, including but not limited to:

(a) "Brown-n-Serve" Rolls: Yeast dough rolls which are fully developed and baked but withdrawn from baking temperature before caramelization of the crust occurs. In this state they are essentially colorless with the intention that baking to create the typical brown color of finished baked products shall be completed by the ultimate consumer.

(b) "Finished Baked Rolls": Yeast dough rolls completely developed and baked to a caramelized crust condition to make them acceptable for consumption "as is."

(c) "Finished Baked Sweet Roll": Yeast or chemically leavened dough products of the nature of corn muffins, fruit muffins, Danish pastries, nut rolls, etc., fully baked for consumption "as is."

(d) "Finished Baked Cakes": Chemically leavened sweet dough products of the nature of Cup Cakes, Mary Ann Shells, Tortes, etc., fully baked for consumption "as is." Of the four above classifications of rolls pertinent to this invention, the Brown-n-Serve classification is the most difficult type to handle automatically and its typical packaging container the most difficult to insert to product into. Therefore, the description of this invention is primarily concerned with its capability in the automatic depanning and packaging of Brown-n-Serve rolls but it should be understood that this is not to the exclusion of its capability with the less difficult types of rolls.

One of the difficulties in automating the packaging of the "brown and serve" rolls is that these rolls do not have a fully developed and caramelized crust and are marketed in as "soft" condition as possible. In fact, these packaged rolls have a consistency more analogous to that of raw dough than that of most finished baked products. Therefore conventional mechanized bakery handling devices and processes have been impractical for this use. As a consequence, manual handling has heretofore been the only practical technique for removing the "soft" rolls from the pans and inserting them into the package in spite of severe shortcomings in the maintenance of proper sanitation standards and final package appearance.

Another problem involved in the packaging of the soft "brown and serve" rolls which at least partially accounted for the necessity for manual packaging is the requirement that they be compactly placed in the package so that no movement occurs between the individual rolls. Because of their spongy character, this meant that the last roll in a flat package, or the twelfth roll put into a package of a dozen, was required to be substantially compressed simultaneously with insertion into the package. If compressed when fitted into the package, the rolls are held against movement within the finished package.

Raising still another obstacle to the automatic handling of these partially baked rolls is the uneven contour of their top surface, the only exposed surface when the rolls are located in the baking pans. "Brown and serve" rolls are generally formed in either a cloverleaf or three section pattern, a two section pattern, or a multiple vertically stacked section roll. All of these sectioned rolls present uneven and varying contour top surfaces which further complicates the problem of their being handled automatically.

It has been an objective of this invention to overcome these problems in packaging "brown and serve" rolls, and to provide a machine and process operable to automatically handle and package these "soft" dough products. Specifically, the apparatus of this invention is operable to automatically remove the baked "brown and serve" rolls from the baking pans in which they are baked and insert them into the containers or packages in which they are sold to the ultimate consumer.

Still another objective of this invention has been to provide a technique for handling soft, partially baked, dough products. To this end, I have discovered that a suction cup having a dough engaging rim section less resistant to deformation than the soft dough may be used for this purpose. When brought into contact with the top section of an irregularly contoured top surface of such a roll, as for example a cloverleaf roll, the supple rim section will partially accept the irregular contour and when air is drawn through the cup, the rim section will further flex to form a seal with the top of the roll without distorting the roll shape or contour.

When the rolls are transported by a vacuum actuated suction cup mechanism, air is withdrawn from the partially baked rolls. This is particularly advantageous for packaging "brown and serve" rolls since the partially collapsed rolls are easily inserted into the package. Thereafter, upon the release of the vacuum, the rolls expand within the container and are thus precluded from relative movement within the package. If the walls of the container or package are susceptible to inward collapse, as are many flimsy containers, box spreaders may be mounted on the machine to fully open the top of the container so that the rolls may be placed therein. Thereafter the spreaders release the sides of the carton for inward collapse against the sides of the rolls thus preventing relative movement between them in the finished package.

A brief description of the machine of this invention will facilitate an understanding of these and other objectives of the invention. Very briefly, the machine includes a pair of laterally spaced endless conveyors mounted upon a portable frame. These conveyors run in parallel such that one conveyor carries the baking pans and rolls to the loading station while the other conveyor carries preassembled cartons or containers to the loading zone or station. The purpose underlying this conveyor arrangement is twofold. First, to effectively isolate the inevitable soil or spore on the "pan side" of the machine from the "container side" and thus avoid soiling or contaminating of the containers with spore. Second, the lateral conveyor arrangement permits the machine to be constructed in a right or left-hand arrangement, i.e., with the pan conveyor located on either the right or left-hand side of the carton conveyor, so as to accommodate specific bakery production layouts.

A movable abutment engages the pans and holds a loaded pan at the unpacking station until a transport mechanism having a plurality of suction cups depending therefrom engages the tops of the rolls and moves them upwardly out of the pan. The conveyor then indexes another baking pan into the unloading zone. The transport mechanism after having moved the rolls upwardly out of the pan then moves laterally on a pair of overhead ways to a packing zone where it moves the rolls downwardly into the preassembled container. With the rolls located in the container, the vacuum to the suction cups is released and the rolls remain in the box as the suction cup carrying head moves upwardly and back to a position over the baking pan line. As the head moves upwardly, the carton carrying conveyor transports the loaded carton, which is now full of rolls, further along the conveyor and moves an empty carton into the loading zone. An interlock system is provided such that in the event that a pan of rolls is not located in the unloading zone, the transport head will remain stationary over the unloading zone until such time as a pan moves into position to be unloaded. Similarly, if a carton is not located at the loading station the transport mechanism will remain in its upper position until such time as a carton is moved into the filling or loading zone. The head will then move downwardly and deposit the rolls in the container. Thus, the machine is operable to carry on this unloading of pans and loading of containers so long as pans move into the unloading zone and containers move into the loading zone. In practice the machine is generally set to run at a rate of 30 cycles a minute although it is equally adapted for operation at a much faster rate.

Another aspect of this invention is that the entire packaging machine is mounted upon rollers and is portable. To anchor it in position at its position in a production line for use with rolls when the bakery is manufacturing this product, air actuated cylinders are located at two diagonally opposite ends of the machine. When the air supply to the machine is plugged into the common bakery air supply line, these cylinders are actuated so as to frictionally engage the bakery floor and anchor the machine in its position in the bakery line to receive the baked goods without any intermediate handling. Thus, the machine may be used, for example, on a two day production run and thereafter moved out of the way until the next time rolls are produced in the bakery.

Another important aspect of this invention is that it eliminates collation of the rolls between the oven and the container in which they are packed for shipment. The rolls are baked in novel baking pans on the same centers or in the same physical orientation in which they are to be packed and are transported between the pans and the container in this relationship. Not only does this simplify handling of the rolls but it also appreciably increases the speed at which the rolls may be packed.

One advantage inherent in the use of this packaging machine is the sanitation which results from its use. A more sanitary packaged product, of course, means a longer "shelf life" for the product. Shelf life is a function of the spore count of the packaged product. Heretofore, with manual packaging of the product, spore were transported from the baking pans to the hands of the packagers onto the rolls prior to insertion into the package. With this invention, the baking pans are never contacted by the transport medium so that spore are not picked up from the baking pans and placed on the rolls by the transport medium. Thus, a longer shelf life of the finished product is achieved.

These and other objects and advantages of this invention will be more readily apparent from a description of the drawings in which:

FIGURE 1 is a perspective view of the machine of this invention,

FIGURE 2 is an enlarged perspective view of the pan unloading and carton loading zone of the machine with the transport head in the raised position preparatory to pick-up of the rolls from the pan, FIGURE 3 is a view similar to FIGURE 2 with the transport head having moved downwardly to the roll engaging position preparatory to removing the rolls from the pan, FIGURE 4 is a view similar to FIGURE 2 with the transport head located over the carton preparatory to downward movement of the head to place the rolls in the carton, FIGURE 5 is an enlarged perspective view of the carton loading zone and transport head just prior to insertion of the rolls into the preassembled carton, FIGURE 6 is a side elevational view of the lower portion of one side of the machine, FIGURE 6A is a side elevational view of the upper portion of one side of the machine.

FIGURE 7 is a front elevational view of the machine of this invention,

FIGURE 8 is a rear elevational view of the machine of this invention,

FIGURE 9 is a top plan view of the machine of this invention,

FIGURE 10 is a front elevational view of the transport mechanism of the machine with the transport head shown in phantom in the pan unloading position, and the carton filling positions, FIGURE 11 is a cross sectional view taken along line 11—11 of FIGURE 10, FIGURE 12 is a cross sectional view taken along line 12—12 of FIGURE 10.

Figure 32:
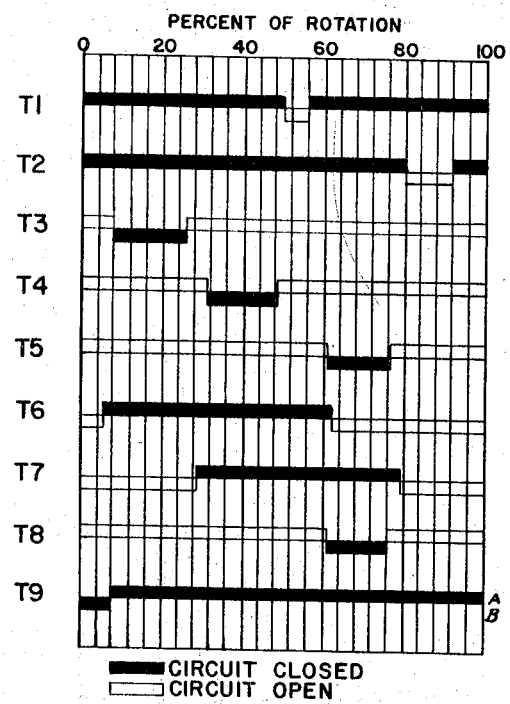

FIGURE 13 is an elevational view partially broken away of the control valve of the machine, FIGURE 14 is a view similar to FIGURE 13 but showing the valve spool in a second position, FIGURE 15 is a cross sectional view taken along line 15—15 of FIGURE 14, FIGURE 16 is a cross sectional view of a suction cup taken along line 16—16 of FIGURE 12, FIGURE 17 is an elevational view of the vacuum adjusting mechanism, FIGURE 18 is a cross sectional view taken along line 18—18 of FIGURE 17, FIGURE 19 is a cross sectional view taken along line 19—19 of FIGURE 17, FIGURE 20 is a cross sectional view taken along line 20—20 of FIGURE 6, FIGURE 21 is a cross sectional view taken along line 21—21 of FIGURE 20, FIGURE 22 is a cross setional view of the box spreader mechanism taken along line 22—22 of FIGURE 9, FIGURE 23 is a view similar to FIGURE 22 but with the box spreader mechanism engaged with a box or carton, FIGURE 24 is a cross sectional view taken along line 24—24 of FIGURE 23, FIGURE 25 is a cross sectional view taken along line 25—25 of FIGURE 23, FIGURE 26 is a cross sectional view taken along line 26—26 of FIGURE 23, FIGURE 27 is a cross sectional view taken along line 27—27 of FIGURE 26, FIGURE 28 is a cross sectional view of the pan stop mechanism taken along line 28—28 of FIGURE 7, FIGURE 29 is a view similar to a portion of FIGURE 28, but showing the position of the pan detecting switch when engaged with a pan, FIGURE 30 is a top plan view of the pan stop mechanism taken along line 30—30 of FIGURE 28, FIGURE 31 is a diagrammatic illustration of the electrical circuit of the machine of this invention, FIGURE 32 is a circuit timing chart of cam controlled switches of the electrical circuit, FIGURE 33 is a diagrammatic illustration of the pneumatic system of the machine of this invention.

*Overall organization*

Referring to FIGURE 1, it will be seen that the machine of this invention includes an endless pan conveyor 10 and a parallel endless carton conveyor 11. These conveyors are mounted on the frame indicated generally by the numeral 12. When in use in a bakery the pan conveyor 10 is longitudinally aligned with the flow of bakery production so that pans having baked products therein are conveyed or directed onto the pan conveyor 10. As viewed in FIGURE 1, both of these conveyors run in the counterclockwise direction. When the machine is in operation, both run continuously. A stop mechanism 13 is associated with the pan conveyor so as to temporarily hold a full pan in the unloading zone until such time as the baked products in the pan have been removed. The stop then allows the empty pan to move forwardly on the conveyor and halts the following pan at the unloading zone. A similar stop mechanism 14 (see FIGURE 2) is associated with the carton conveyor and is operable to stop a preassembled carton at the unloading zone until such time as it is filled with baked products. The stop then withdraws to permit the full carton to move forwardly on the conveyor 11 and an empty container to be moved into the loading zone.

Mounted over the conveyors 10 and 11 are a pair of ways 15, 16 which extend transversely across both of the conveyors. These ways support a transport head 20 for lateral movement back and forth between the two conveyors. Depending from the transport head 20 are a plurality of suction cups 21 operable to engage the baked rolls, lift them from the pan, transport them upon lateral movement of the transport head to the carton conveyor and place them in the empty carton located at the loading station. The transport head then moves upwardly and laterally back over the pan conveyor to its original starting position. This cycle will be continued so long as pans are supplied to the pan conveyor and cartons to the carton conveyor.

In the event of a time lapse between the arrival of the transport head 20 at its starting position over the pan conveyor and the arrival of a full pan at the unloading zone, the transport head will remain in its raised position until such time as the full pan arrives into the unloading zone. Similarly, if the transport head arrives over the carton conveyor prior to the arrival of an empty carton in the loading zone, the transport head will remain in its raised position. As soon as the empty carton arrives at the station, however, the cycle will be continued and the baked products or rolls lowered into the carton.

Referring to FIGURE 2, it will be seen that the rolls located in the pan are oriented in the same physical relationship or otherwise expressed are located on the same centers when in the baking pan as in the filled cartons. Thus, the rolls do not have to be collated between the pans and the cartons since they are already located in the proper physical relationship for packing at the time they leave the oven in the baking pans. Thus, it is only necessary for the suction cups attached to the transport head 20 to lift the rolls from the pan, carry them to the loading zone, and deposit them in the preassembled carton.

On of the keys to this invention which facilitates this type of automatic handling of brown and serve "soft" dough products having an uneven top surface contour is the novel suction cup used with this machine for transporting the rolls. Referring to FIGURE 16, it will be seen that the cup consists of a vertical cylindrical section 30 having at its lower end an outwardly and downwardly extending tapered flange 31. In cross section the flange defines an obtuse angle of approximately 135° with the cylindrical section. The outward taper of the flange 31 is approximately 10° so that the flange periphery 32 consists of a very thin and supple veil. A perforated membrane 33 extends across the bottom of the central aperture in the cylindrical section 30 of the cup so as to preclude dough from being sucked up through the aperture 34 into the mechanism of the invention. The suction cup is made from a very soft rubber or elastomeric material having a hardness of approximately 50 to 60 durometer. Thus, the outer peripheral rim section 32 of the cup is sufficiently supple as to partially accept the uneven contour of the top of the roll when it is lightly placed in engagement with it. When air is pulled upwardly through the aperture 34 in the suction cup, the rim section 32 will further flex to form a seal with the top of the roll without distorting its top surface contour. Thereafter, while the seal is maintained between the roll and the cup, the transport head may be moved upwardly to remove the rolls from the pan.

The vacuum system

The vacuum system includes a motor driven turbine 35 (see FIGURES 6, 7 and 8) which pulls air through the suction cups 21 and forces it out through a diffuser 36. The air flow pattern is through the suction cups 21, via a manifold 37 of the transport head 20, through a flexible hose 38 via a two-way valve 39, through a central vertical pipe 40 and a T-shaped elbow 41, to the turbine air intake orifice 42. Air is exhausted from the turbine through the outlet duct 43 via the diffuser 36 attached to one end of the duct 43.

The manifold consists of an upper and lower plate 45 and 46 respectively bolted together and so shaped as to define an air pocket therebetween. Depending from the lower plate 46 are a plurality of nipples (not shown) over each one of which is telescoped the cylindrical body 30 of a suction cup. Thus, air passageways are provided between the air pocket of the manifold and the exterior of the suction cups via the aperture membranes 33, the central aperture 34 of the suction cups and the nipple depending from the bottom of the lower plate 46. Extending upwardly from the top plate 45 is an annular hose coupling flange 48 having a central aperture which extends into the air pocket of the manifold. Attached to the flange 48 is the lower end 49 of the flexible hose 38. The upper end of the hose 38 is connected to a right angle elbow 51 by a coupling 50. The opposite end of the elbow 51 is connected to the two-way valve 39 by means of an externally threaded sleeve 52.

Referring to FIGURES 13 and 14, it will be seen that the lower end of the valve 39 telescopes over the vertical pipe 40 and is attached thereto by a plurality of bolts 54. The valve 39 also includes a pneumatic motor actuated spool 55. The spool is movable between a lower position (FIGURE 14) in which its lowermost surface sealingly seats upon the top of the pipe 40 to an upper position in which the spool sealingly seats against the lowermost edge 56 of a valve cap 57. As may be seen in FIGURE 15, the cap 57 has four apertures 58 equally spaced around its upper surface which extend into the interior of the valve. These apertures serve as exhaust ducts which, when the valve is in its lower position, open the suction cups to atmospheric pressure. When the valve spool 55 is in its upper position (FIGURE 13) the upper end of the spool precludes air at atmospheric pressure from entering the valve.

Movement of the spool 55 is controlled by the pneumatic motor 60. The piston rod 61 of the motor 60 is attached at its lower end to the spool 55 by a bolt 62 threaded over the lower threaded end of the rod 61. The motor has the usual upper and lower inlet ports 63, 64 through which air is supplied to the motor to cause it to move either up or down depending upon which of the ports is connected to the pressure side and which to the exhaust. This is in turn controlled by an electrically actuated solenoid valve as is more fully explained hereinafter in connection with the description of the electrical and fluid diagrams.

When the valve spool 55 is in its upper position, air is pulled in through the suction cups and downwardly past the valve spool 55 through the pipe 40 and T-joint 41 to the turbine 35. Attached to the lower end of the T-joint 41 is a clean-out trap 67 in which is collected heavy debris drawn in through the suction cups. In making the right angle turn through the T-joint 41 the heavier debris and foreign matter drops into the trap 67 while the air is drawn into the turbine 35.

The turbine casing 70 is mounted upon the frame 12 with a sleeve enclosed input shaft 71 extending through the rear of the casing 70. A pulley (not shown) is nonrotatably connected to its rearward end and is driven through a belt drive (not shown) from a motor 73. Both the turbine pulley and motor pulley are enclosed within a housing 74 for safety and cleanliness purposes.

Air is exhausted from the turbine through an outlet port 76 in the casing through the pipe 43 and hence into the diffuser 36 attached to the end of the pipe. The diffuser 36 serves the twofold purpose of an exhaust air cleaner and a vacuum adjustment. By controlling the amount of air permitted to pass outwardly through this diffuser, vacuum pressure on the suction cups may be closely regulated.

Referring to FIGURE 20, it will be seen that the diffuser 36 is of a three piece construction, comprising a nozzle 80, a plug 81 threaded into the nozzle, and a filter 82 rigidly attached to the plug. At one end the nozzle 80 is exteriorly threaded as indicated at 83 for threading into the end of pipe 43 so as to be mounted therein. The opposite end 84 of the nozzle is threaded interiorly to receive the exterior threads 85 of the plug 81. A pair of generally triangular metering ports 86, 87 are machined in the interiorly threaded end 84 of the nozzle. They are located on diametrical opposite sides of the nozzle and are generally triangular in shape.

The plug 81 is a solid piece of metal, such as aluminum, having the threads 85 machined into the exterior thereof such that it may be threaded into the interior threads of the nozzle so as to adjustably cover the metering ports 86, 87. Rigidly attached to the plug at its exposed end 88 is one end of the housing 89 of the filter 82. The housing 89 is generally cup-shaped and has an inwardly turned flange 90 telescopically received over the nozzle 80. An annular ring 91 is attached to the inner edge of flange 90 by a series of bolts 92. A set screw 93 is provided in ring 91 for purposes of locking the housing 82 and thus the plug 81 in an adjusted position relative to the nozzle 80.

Bolted to the end of the housing 89 is a handle 94 which, when rotated, threads the plug 81 into or out of the nozzle 80. As the plug is threaded into the nozzle it covers the metering ports so as to limit the amount of air which may be exhausted through them.

The end of the housing 89 has a plurality of small apertures 96 extending therethrough so that air exhausted through the nozzle 80 into the filter via the metering ports 86 and 87 may escape through the apertures 96 to the atmosphere. Thus, as the plug 81 covers more of the metering ports, it reduces the amount of air which may escape through the apertures 96. For bakery cleanliness purposes, the housing 89 has a packing material 97 therein which catches and holds foreign matter which would otherwise pass onto the floor of the bakery.

As should now be readily apparent, when the turbine is rotating, air may be pulled in through the suction cups passing by the raised spool 55 of valve 39 and exhausted through the diffuser 36. By varying the uncovered portions of the metering ports 86, 87, the amount of air which passes through the ports and thus the amount of vacuum at the suction cups may be varied. The metering ports are generally triangular in configuration so that a given linear displacement of the plug 81 results in a linear change of the vacuum produced at the suction cups. To release the vacuum at the suction cups, the spool 55 is moved downwardly to the position shown in FIGURE 14 so that the interior of the cups is exposed to atmospheric pressure through the apertures 58 in the valve cup 57.

*Conveyors and stop mechanisms*

Mounted upon the frame 12 for lateral support of each of the chain conveyors 10 and 11 are four thin sheet metal plates 200, 201, 202, 203 each of which has curved ends 204, 205, 206, 207 in the front of the machine and similar curved ends at the rear of the machine. The two plates 200 and 201 which support the pan conveyor 10 define between them a longitudinally extending slot through which depend the lugs 210 of the pan conveyor 10. Similarly, the plates 202 and 203 define a longitudinal slot through which depend the lugs 210 of the carton conveyor 11. A longitudinal slot 211 also extends between the two centermost plates 201, 202.

A conveyor driving shaft 212 is rotatably journalled in a pair of bushings 213 attached to the side frame members 214 at opposite sides of the machine. It extends beneath the curved ends 204, 205, 206 and 207 of the conveyor supporting plates. Nonrotatably keyed to this shaft is a sprocket 215. A pair of conveyor driving sprockets (not shown) are also nonrotatably journalled on the shaft 212 in positions to receive the lugs 210 of the conveyors 10 and 11. The central sprocket 215 is driven in rotation by a chain 216 which is in turn driven by a sprocket 217 attached to the output shaft (not shown) of a gear reduction unit 218. The input shaft of the gear reduction unit 218 is in turn driven by an electrical motor 219. Thus rotation of the motor 219 causes rotation of the conveyors through the chain and sprocket drive. The chain 216 and the sprockets 215 and 217 are covered by a shield 220 which extends upwardly between the two plates 201 and 202 through the slot 211 defined therebetween.

At the rear of the machine a idler shaft 221 extends between bushings 222 supported in the side frame members 214. The shaft 221 supports a pair of idler sprockets (not shown) associated with the lugs 210 of the conveyors 10 and 11 at the rear of the machine.

When the machine is in operation, the endless conveyors rotate continuously so that stops are required to hold the pans and cartons at the unloading and loading zones respectively.

Referring to FIGURES 1 and 28, it will be seen that the pan stop assembly 13 extends upwardly through a pair of slots 225 in the plates 200 and 201 such that one slot is located on each side of the pan conveyor. Movable pan stops 235, 236 extend upwardly through each of these slots into a position to be engaged by pans on the conveyor 10.

Referring to FIGURES 28 through 30, it will be seen that the pan stop mechanism 13 includes a U-shaped bracket 230 bolted to the frame 12 beneath the supporting plates 200, 201. Extending between the bifurcated legs of the bracket 230 and journalled therein is a pivot shaft 231 which supports stop bars 232, 233. Both of the stop bars are nonrotatably pinned to the pivot shaft 231 by a pair of taper pins 234. Upstanding from each of them are the vertical pan stops 235 and 236 which extend through the slots 225, into a pan engaging position above the plane of the conveyors.

Movement of the stop bars 232, 233 is controlled by an air cylinder 240, the lowermost end of which is bolted to a bracket 241 attached to the frame 12 and the opposite end of which is pivotally attached by a bifurcated bracket 242 and pin 243 to the stop bar 232. The web of the bracket 242 has a central aperture 245 through which extends the piston rod 246 of the air cylinder 240. The end of the piston rod 246 has an enlarged head 247 located between the legs of the bifurcated bracket 242. The head 247 precludes movement of the piston rod out of the bracket. A pair of lock nuts 248 are threaded onto the piston rod 246 at a point below and spaced from the bracket 242. The uppermost surface 249 of these lock nuts served as an abutment for one end of a compression spring 250, the opposite end of which abuts against the lowermost surface 251 of bracket 242. The spring 250 permits the pan stops 235, 236 to be pushed down manually without movement of the air cylinder or piston rod.

An indicator mechanism 254 including a mercury switch 255 is associated with the stop mechanism so as to indicate the presence of a baking pan in engagement with the pan stop mechanism 13. When a pan is located in abutment with the lugs 235 at the unloading station, the indicator mechanism 254 is tripped (as shown in FIGURE 29) so as to permit the machine to continue cycling as is explained more fully hereinafter in connection with the electrical control circuit.

The indicator 254 includes generally Z-shaped feeler 258, one end of which is attached to a U-shaped support 259 pivotally mounted upon the shaft 243. The opposite end 260 of the feeler extends upwardly through the slot 225 in the conveyor support 201 and has an inclined surface 261 against which pans moving forwardly on the conveyor 10 engage to force the feeler downwardly from the position shown in FIGURE 28 to the position shown in FIGURE 29. The feeler is biased upwardly into a position in which its inclined end 260 extends above the horizontal plane of the conveyor 10 by a tension spring 263, one end of which is connected to the feeler and the opposite end of which is connected to a pin 264 mounted in the stop bar 232. Thus the feeler 258 is free for pivotal movement about the pin 243 independently of the stop bar 232 movement. However, movement of the stop bar causes the feeler and attached mercury switch 255 to move downwardly with it.

The switch 255 is mounted upon the stop mechanism by a pair of L-shaped brackets 270, 271, one (270) of which is connected to the stop bar 232 and the other (271) of which is connected to the feeler 258. Intermediate the bracket 271 and a generally rectangular switch support plate 273, is a connecting link 275 which permits pivotal movement of the plate 273 relative to the stop bar 232. The mercury switch 255 is attached to the support plate 273 by a pair of screws 278, 279 which extend through angulated slots 280, 281 in the switch and are threaded into the plate 273. The angulated slots permit limited horizontal adjustment of the switch 255.

The mercury switch 255 is a normally open switch which remains open so long as the switch is located in an angulated position as shown in FIGURE 28. It remains angulated so long as the feeler is raised indicating that there is no pan in engagement with the feeler 258. When a pan forces the feeler downwardly, it causes the switch support 273 and attached switch 255 to pivot about the pin 243 moving the mercury switch into a horizontal position. When the switch is in this position, a circuit is closed indicating the presence of a pan at the unloading station.

The carton stop mechanism 14 is identical to the pan stop mechanism 13 except that there is no indicator mounted directly upon it. Rather than using a mechanical feeler to indicate the presence of a carton which is generally of insufficient weight to reliably actuate a mechanical device, a photoelectric cell 592 is mounted adjacent the carton stops. When a carton abuts the carton stops, a light beam is broken to actuate a photoelectric control panel as is more fully explained hereinafter in connection with the electrical circuit.

*Transport head*

Referring to FIGURES 2, 3, 4, 10, 11 and 12, it will be seen that the transport head assembly 20 consists of a laterally translatable saddle 290, a vertically adjustable slide 291, and the vertically reciprocal manifold 37 movably mounted upon the slide 291. The saddle is movably mounted upon the guide rails 15, 16 which extend through four bearings 292 mounted in enlarged bosses 293 of the saddle. Lateral movement of the saddle 290 is controlled by an air motor 295 the cylinder of which is rigidly attached to the side frame member 100. The piston rod 296 of motor 295 is connected at its end to a rearwardly extending bracket 297 of the saddle 290 so that actuation of the motor controls movement of the saddle.

The vertically adjustable slide 291 is mounted within a dove-tailed way 300 machined into the front vertical surface of the saddle. Adjustment of the slide is provided as a means to control the lower limit of movement of the manifold 37 and the suction cups 21 carried by it. For purposes of adjustment of the slide, its upper end is provided with a rearwardly extending flange 305 having a central aperture through which extends a vertical adjusting screw 306. The screw has a hand wheel 307 attached to its upper end. It is rotatably mounted within the flange 305 but is so connected as not to be axially movable relative to it. The lower end of the screw is threaded into a rearwardly extending flange 308 of the saddle so that upon rotational movement of the hand wheel 307, the slide 291 is caused to move vertically. A lower locking nut or hand wheel 309 is threaded onto the screw 306 so as to lock the slide 291 in an adjusted position.

In the normal cycle of operation, reciprocal vertical movement of the manifold 37 is controlled by an air motor 304, the cylinder of which is rigidly attached to the slide 291. The lower end of the piston rod 310 of motor 304 is rigidly connected to the manifold 37 so that upon actuation of the air motor 304 the manifold will be moved upwardly and downwardly. To guide the manifold during vertical movement, a pair of vertical guide rods 311, 312 extend upwardly from the manifold through bushings 313, 314 mounted in the saddle. Thus, upon energization of the air motor 304, the slide is moved upwardly and downwardly and is guided during this movement by the guide rods 311 and 312.

*Box spreader mechanism*

When the rolls are picked up by the suction cups, air is withdrawn from the rolls so that they are partially collapsed when inserted into the boxes or cartons 320. So long as the sides of the carton remain in a vertical plane there is no problem inserting the rolls into the box. When released by the suction cups the rolls then expand so as to be immovably held within the carton. However, the side walls of many preassembled cartons collapse inwardly as shown in FIGURE 22 so as to render it difficult to insert even partially collapsed rolls into the carton. For this reason a box spreader mechanism 321 may be provided to insure that the side walls of the container remain in the vertical plane as the rolls are inserted.

Referring to FIGURES 22 through 27, it will be seen that the box spreader mechanism 321 is attached to the frame 12 beneath the carton conveyor 11. Carton openings bars 322 and 323 form a part of the spreader and extend upwardly through the conveyor supporting plates 202 and 203. Each bar is generally U-shaped and extends over the carton conveyor to form a bridge beneath which cartons on the conveyor may pass. Attached to the bars are box engaging fingers 324 operable to engage the leading and trailing edges of the cartons and hold them in the fully open position as illustrated in FIGURE 23.

The box spreader mechanism is connected to the frame 12 by a pair of longitudinally spaced brackets 327, 328 between which extend a pair of guide rods 329, 330. Supported upon the guide rods 329, 330 are a pair of generally rectangular housings 331, 332 within each of which is mounted the operating mechanism for actuating the box spreader fingers 324 of the front bar 323 and the rear bar 322 respectively. Since both of these operating mechanisms are identical, only the front one will be described in detail although it should be understood that an identical mechanism is contained within the rear housing 332.

The front housing consists of a pair of laterally extending plates 334, 335 interconnected by a pair of side plates 336, 337. A pair of spacer blocks 338, 339 are located between the plates 334, 335. Each of these blocks has a central aperture therein co-axial with apertures in the plates 334, 335 through which extend the guide rods 329, 330. Each of the side plates 336 and 337 has a coaxial lateral aperture 341, 342 therein which is located above the spacer blocks. An axle 344 extends through these lateral apertures with its ends extending beyond the side plates 336, 337. A spur gear 347 is nonrotatably attached to the axle near its center and a pair of spur gears 348, 349 are connected to opposite ends of the axle. Rotation of the spur gear 347 and thus of the axle 344 is controlled by a rack 350 mounted above the gear 347 and engaged with it. The rack 350 extends rearwardly over the gear 347 and over a similar gear 351 of the gear box spreader operating mechanism. Attached to the upper surface of the rack is an L-shaped bracket 352, the vertical leg of which is bolted to the end of piston rod 353 of an air motor 354. The cylinder of the motor 354 is in turn connected to the frame 12 by a bracket 355. Thus actuation of the motor 354 controls longitudinal movement of the rack and thus rotational movement of the axles 344 and 357. In order to hold down the forwardmost end of the rack 350 and maintain it in engagement with the gear 347, a roller 358 is engaged with its upper surface. The roller 358 is mounted upon a pin 359 attached to a bracket 360 the lower end of which is welded to a supporting block 361 connected to the housing 331. To further brace the bracket 360, a supporting plate 362 is welded to it and extends between the guide rods 329, 330.

The gears 348, 349 attached to the ends of the axle 344 are each engaged with the teeth of vertically extending racks 365 and 367. To insure that the teeth of the racks 365 and 367 remain in engagement with the teeth of the pinions 348, 349 respectively, rollers 370, 371 engage the leading edge of the racks 365, 367 respectively. The rollers are rotatably supported upon pins 372 journalled in apertures of brackets 374 mounted on the axle 344.

As the racks are moved downwardly upon rotation of the axle 344, they simultaneously move inwardly toward the sides of the carton 320. This movement locates the spreader fingers 324 attached to the racks inwardly over the sides of the carton so that the fingers engage the carton side walls and cam them outwardly. Upon upward movement of the racks, the fingers are cammed upwardly and outwardly to disengage them from the carton and permit it to continue its movement along the conveyor while an empty carton is conveyed into the carton filling position (FIGURE 22).

To facilitate this spreader finger movement, a cam slot 376 is provided in each of the racks. The slot extends vertically and has an arcuate inwardly extending section 377 at its lower end. A follower roller 378 is rotatably journalled in each of these slots. The rollers 378 are supported between the side plates 336, 337 and brackets 380 are bolted to each of them. Because the rollers have no linear movement, they cam the racks 365, 367 inwardly as they are moved downwardly.

Attached to each of the racks 365, 367 and extending between them is the U-shaped bar 323 upon which are mounted the box engaging fingers 324. Referring to FIGURE 1, it will be seen that the bars 322, 323 have a horizontal section extending over the carton conveyor with the vertical legs being attached to the racks 365, 367.

The finger carrying brackets 322, 323 are removably mounted upon the racks 365, 367 so as to accommodate various size cartons. For this purpose the upper end of each rack has a recess machined from one side 381. The horizontal edge 382 of the recess has a groove 384 machined therein and adapted to receive a lower rib 385 on the bottom of each leg of the bar. Each leg of the bar also has a clamping protrusion extending generally horizontally from an edge surface. This protrusion is clamped between the top surface 387 of the rack and the lower surface of a clamp 388 bolted to the top of the rack. Thus, the U-shaped bars and attached fingers 324 are securely held on the racks, but may be quickly removed and replaced with differently dimensioned bars usable with other size cartons.

To further accommodate boxes of differing length, the mounting rods 329, 330 each have a pair of threaded set screw receiving apertures 390 along their lower edges. The apertures 390 are located at various longitudinal locations along the rod so as to receive the set screw 391 which locks the forwardmost housing 331 in varying longitudinal positions along the rods.

In operation, the box spreader mechanism is located in the position shown in FIGURE 22 when an empty box is moved into the carton filling position. Thereafter the air cylinder 354 is actuated so as to cause movement of the rack 350 to the left as viewed in this figure. Movement of the rack in this direction causes counterclockwise rotation of the axles 344, 357 and downward movement of the racks 365, 367. As the racks are moved downwardly, they are cammed inwardly toward the leading and trailing edges of the box so that the fingers 324 are moved over and then downwardly into engagement with the top surface of these edges. The fingers 324 thus cam the collapsed vertical sides of the boxes outwardly. After the rolls have been inserted into the carton, the motor 354 is actuated in the reverse direction so as to cause upward movement of the racks and thus of the fingers. With the fingers out of alignment and out of an interfering position with movement of the cartons along the conveyor, the filled carton is moved forwardly and an empty carton is moved into the carton filling position.

*Pneumatic control system*

Referring to FIGURE 33, there is shown a diagrammatic illustration of the pneumatic system used to operate the machine of this invention. The motors of the system are controlled by the electrical control circuit illustrated in FIGURE 31.

All commercial bakeries are supplied with a source of air pressure. Therefore, this pressure source is used to operate the machine of this invention although it should be understood that hydraulic or electrical motors could be used in place of the pneumatic motors illustrated. However, the pneumatic system is generally more convenient.

As shown in FIGURE 33, air pressure is supplied to the machine inlet line 420 from a common bakery air pressure line. Air from the inlet 420 is distributed via conduit 421 through an air filter 422 and a conventional drip lubricator 423 to a high pressure line 424. Air from the high pressure line 424 is distributed to the floor lock motors 425. The floor lock motors are located adjacent the two diagonally opposite rollers upon which the machine is mounted. Each motor has a floor engaging pad on the lower end of its piston rod. The piston of each motor is spring biased upwardly such that in the absence of air pressure to these motors the pads 426 will be raised or disengaged from the floor. However, when the common bakery air pressure supply line is connected to the machine at the inlet 420, each motor is actuated so as to force its floor engaging pad downwardly to frictionally lock the machine in a position at the end of a bakery oven line.

A pressure switch PS is mounted in the high pressure line 424. This switch is connected to the electrical circuitry as is explained more fully hereinafter and functions so as to insure that the air pressure to the machine is at a preset level before the machine cycle is started. In a preferred embodiment this pressure switch is set for 70 p.s.i. so that the machine will not operate unless 70 pounds of pressure is supplied to the machine.

Also connected to the high pressure line 424 is a conduit 427 leading to an interlock valve 428. This valve is a two-way solenoid actuated valve connected by a conduit 429 through a one-way check valve 430 to the vertical cylinder control motor 304. Connected between the check valve 430 and the lower inlet port 431 of the motor 304 is a conventional four-way valve 432 and a one-way check valve 433. A metering valve 434 is connected in parallel with check valve 433. As is explained more fully hereinafter in connection with the electrical diagram, the interlock valve 428 functions to supply high pressure air to the lower inlet port 431 of the vertical cylinder 304 immediately upon starting of the machine cycle. It thus insures that upon starting of the machine, the transport head 20 is raised immediately to its upward position before any horizontal movement of the head occurs.

High pressure air from the supply 420 is also supplied via a conduit 440 to the inlet port of an emergency dump valve 441. This valve is a conventional solenoid actuated two-way valve which is energized upon starting of the machine cycle so as to supply pressure to a pressure regulating valve 442 via conduit 443. In the event that the operation of the machine is stopped upon actuation of the emergency stop button 444, the solenoid of valve 441 is de-energized so as to connect the outlet port 446 to an exhaust line 447. With the outlet port 446 of the valve 441 connected to the exhaust line, all movement of the pneumatic motors of the machine is immediately stopped.

The pressure regulating valve 442 serves to reduce the supply pressure. In the preferred embodiment this valve reduces the supply pressure of 70 pounds to approximately 60 pounds in the outlet conduit 448 of the valve 442. From the conduit 448 pressure is supplied via conduit 449 through a solenoid actuated four-way valve 450 to the box spreader motor 354. A check valve 451 and metering valve 452 are connected in parallel in line 449 between the four-way valve 450 and motor 354. The metering valve 452 controls the rate at which air may be forced into the lower side of motor 354. A similar one-way check valve 453 and metering valve 454 are connected in parallel between the upper port of motor 354 and the valve 450 so as to control the rate at which fluid is admitted to the upper side of the motor 354. Air from the valve 450 is exhausted via conduits 455 and 456 to the exhaust outlet 457.

Line 449 also supplies pilot pressure to the vertical cylinder control valve 432 and the horizontal motor 295 control valve 460. Both of these valves are conventional solenoid actuated four-way valves which use pilot valve pressure to control movement of the main valve spool. Pilot pressure to the pilot of valve 460 is supplied via conduits 461, 462 and is exhausted via conduits 463 and 464. Pilot pressure to the pilot of valve 432 is supplied via conduits 449 and 465 and is exhausted via conduits 466 and 467 through the exhaust port 468.

Pressure from the regulating valve 442 is also supplied via conduit 448 to a second pressure regulating valve 470. In the preferred embodiment of the invention, this regulator valve 470 functions to lower the pressure in the outlet line 471 to a pressure of 30 to 34 pounds per square inch.

This low pressure air is fed from line 471 through lines 472 and 473 to horizontal motor 295. Connected between the line 473 and the horizontal motor 295 is the four-way distributor valve 460. Between the valve and the ports of the motor are a pair of check valves 474 and 475 each of which has a needle valve 476 and 477 connected in parallel with it. The needle valves serve to restrict the flow of air in the exhaust direction so as to control the rate of movement of the horizontal motor 295.

Low air pressure from line 472 is also fed through conduit 478 and check valve 479 to the control valve 432 of vertical motor 304. In order to control the rate of exhaust from the motor 304, a check valve and needle valve are connected in parallel in each of the conduits between the four-way control valve and the ports of motor 304.

Low pressure air from the line 471 also feeds the vacuum control motor 60, the pan stop motor 240, and the box stop motor 240A. Fluid flow to and from each of these motors is controlled by conventional solenoid actuated four-way valves 480, 481 and 482 respectively. In the case of the vacuum control motor 60 there is a check valve-needle valve by-pass 483, 484 connected between each of the motor ports and the valve 480. The pan stop motor has only a single check valve-needle valve by-pass 485 located between the upper port of the motor and the valve 481. As for the box stop motor 240A, it has a check valve-needle valve by-pass 486, 487 located in each of the lines between the ports of the motor and the valve 482. Each of the valves 480, 481 and 482 is exhausted through the exhaust port 457 via line 456.

*Electrical control circuit*

Referring to FIGURE 31, there is shown a diagrammatic illustration of the electrical control circuit of the machine of this invention. This circuit is used to control the sequence of operation of solenoids of the valves associated with each of the pneumatic motors.

Sequencing of the control circuit is controlled by a nine lobe cam shaft (not shown) operable to control opening and closing of the nine switches T1 through T9. The sequence of actuation of these switches T1 through T9 is shown in the chart of FIGURE 32. As there shown, one full rotation of the cam shaft completes one full cycle of the machine, i.e., from the pick-up of the rolls to their deposit in the cartons and the return of the transport head to a position over a new pan of rolls. Of course, the cam lobes could be cut so that only 180° of rotation would represent one cycle of the machine in which case a full rotation of the cam shaft would represent two cycles of the machine. Alternatively, other programming devices could be used without departing from the spirit and scope of this invention.

Referring again to FIGURE 31, it will be seen that power is supplied to the machine from either a 220 or 440 volt 60 cycle A.C. supply 499 through a conventional fusable disconnect switch 500. The power line of the machine is plugged into the normally covered jack 501 (see FIGURE 1). From the jack power is supplied to the conveyor motor 219 and the blower motor 73. Each motor circuit is equipped with a series of relay contacts 502, 503 respectively.

Connected across leads 504, 505 is the primary winding 506 of a transformer 507. The secondary winding 508 of the transformer 507 is connected at one end to the main control lead 509 and at the opposite end to a main control lead 510 through the normally closed emergency stop switch 444 and normally open pressure switch contact 1–PS. The contact 1–PS is normally open and closes only when the pressure switch PS (FIGURE 33) is actuated upon the preset pressure being supplied to the supply line 420 of the machine, i.e., at 70 pounds pressure in the preferred embodiment. Thus, when electrical power is supplied to the jack 502 and the air pressure is supplied to the input line 420 of the machine, a 110 volt potential is supplied across the leads 509, 510.

To start the machine, the reset button 515 is pushed, followed by the vacuum-on button 516 and the conveyor-on button 517 (see FIGURES 1 and 33). The reset button 515 controls a four blade switch, one blade of which completes a circuit to solenoid A upon actuation of the reset button. This solenoid remains energized so long as the reset button is held by the operator and is effective to supply high pressure air through valve 428 to the lower side of vertical cylinder 304. Thus, the transport head is immediately raised to its upper position prior to any cycling of the machine. Inadvertent horizontal movement of the transport head while in the lower position is precluded and there is no chance of the box spreader fingers interfering with horizontal movement of the transport head. The circuit to solenoid A is completed via lead 510, lead 520, blade 521 of the reset switch 515, through the normally closed contact 1CR–2 of relay 1CR and via lead 522.

An alternate circuit to solenoid A is also provided by-passing the switch 1PS. It completes a circuit to solenoid A via lead 523, through blade 524 of reset switch 515, lead 525, through switch blade 521 and lead 522. This latter circuit is provided as a by-pass around the switch contact 1PS so that in the event that the supply pressure to the machine is just sufficient to actuate the pressure switch PS, the lowering of pressure upon opening of valve 428 will not open the circuit to solenoid A by opening contact 1PS. In the absence of this alternate circuit, whenever the pressure in conduit 424 was just equal to that required to close contact 1PS, the contact 1PS would close to energize solenoid A but would immediately open when the solenoid opened valve 428 causing a drop in pressure. The alternate circuit thus precludes this type of switching of contact 1PS.

If the transport head is in any other position than over the pan or roll pick-up station, actuation of the reset button completes a circuit to the cycle timer motor T so as to rotate the cam shaft to the cycle starting position. Referring to FIGURES 31 and 32, it will be seen that the switch T9 is in engagement with its B contact only during the first 8% of the rotation of the cam shaft and engages its A contact during the remaining 92% of the cycle of rotation. In the event that the transport head is in any position other than over the pan conveyor, the A contact will be closed completing a circuit to the cycle timer motor operable to drive the motor and rotate the cam shaft to the starting position. This circuit is completed via lead 520, lead 525, through blade 521 of the reset switch, via leads 530 and 531, through the switch T9 and leads 532 and 533. When this circuit is completed the timer motor rotates until the cam shaft is in the starting position which represents the position at which the transport head is located over the pan conveyor. At that time the contact A of switch T9 will be opened and contact B closed.

The closing of the B contact of switch T9 completes a circuit to the relay 1CR via a circuit through leads 520, 525, through switch blade 521 of the reset switch 515, via leads 530, 531, through switch T9 and via leads 534 and 535. Energization of relay 1CR opens the normally closed contact 1CR-2 de-energizing solenoid A and closes the normally open contact 1CR-1. This contact acts as a holding contact to the relay 1CR and permits the machine to cycle upon the closing of the switches T1 through T8.

The closing of the contact 1CR-1 completes a circuit to solenoid B of the emergency dump valve 441 via leads 540 and 541. Energization of this solenoid actuates valves 441 so as to supply air pressure to conduit 443 and thus to the air motors of the machine, conditioning them for sequencing.

Referring to FIGURE 32, it will be seen that the normally open switch T1 closes when the cam shaft is located in the cycle starting position. If a pan of rolls is located beneath the transport head on the pan conveyor, mercury switch 255 will be closed completing a circuit to the timer motor T via lead 542, switch T1, leads 543 and 544, mercury switch 255, the normally closed blade 545 of the reset switch 515, and the leads 546 and 533. However, until the conveyor start button 517 is pushed by the machine operator, there will not be a pan of rolls beneath the transport head and the mercury switch 255 will be open. So long as the switch 255 is open, the circuit to the timer motor T will remain open with the cam shaft in the cycle start position.

The next step in the starting of the machine is the actuation of the operator of the vacuum-on start switch 516. Actuation of this switch completes a circuit to the blower motor relay 2MR via lead 556, through the normally closed vacuum stop switch 557, via lead 558, through the vacuum-on switch 516, through the relay 2MR, through the blower motor overload relay contacts 559, and via lead 560. Energization of the relay 2MR closes the contact 2MR-1 completing a holding circuit around the vacuum start switch 516. Energization of this relay also closes the normally open contacts 503 in the blower motor circuit to start operation of the blower motor.

The machine operator next actuates the conveyor start button 517 completing a circuit to the conveyor motor relay 1MR via leads 550, through the conveyor motor stop switch 551, via lead 552, through the conveyor start switch 517, through the conveyor motor relay 1MR, via the overload relay contacts 553 and through lead 554. Energization of the relay 1MR completes a holding circuit through contact 1MR-1 around the conveyor start switch 517 and closes the normally opened contacts 502 in the circuit to the conveyor motor.

When a pan of rolls arrives against the pan stop, mercury switch 255 is closed, completing a circuit to the timer motor T. This circuit is completed via lead 542, switch T1, leads 543, 544, switch 255 and the leads 546, 533. The completion of this circuit starts rotation of the cam shaft (not shown) which controls switch T1 through T9. After the cycle timer has rotated the cam shaft through approximately 8% of a cycle of rotation, switch T3 is engaged by a cam lobe on the shaft forcing the switch to close and complete a circuit to solenoid C of valve 432. This circuit is completed via lead 565, switch T3, lead 566, and lead 567. Energization of this solenoid moves the valve 432 into a position in which air pressure is fed by a line 472 to the upper side of the vertical cylinder 304 so as to force the piston of this motor downwardly carrying with it the transport head 20.

Just prior to the downward movement of the transport head, after approximately 6% of a cycle of rotation of the cam shaft, switch T6 is closed by a cam lobe to complete a circuit to solenoid E of valve 480. This circuit is completed via lead 580, switch T6, and leads 581 and 582. Energization of solenoid E actuates the valve 480 so that motor 60 causes a vacuum to be applied to the suction cups of the transport head 20. After the cam shaft has been rotated through approximately 90° or 25% of the cycle, switch T3 is opened by disengagement with the cam shaft opening the circuit to solenoid C and thus de-energizing solenoid C. De-energization of solenoid C permits the valve 432 to move into the de-energized position in which air is supplied from line 472 to the lower side of the vertical motor 304. The transport head is thus moved upwardly preparatory to horizontal movement.

After the cam shaft has rotated approximately 100°, the normally open switch T7 is engaged by a lobe on the cam shaft and caused to close, thereby completing a circuit to solenoid F via leads 584, 585 and 586. Energization of solenoid F causes movement of the spool of valve 460 thereby supplying air pressure to the horizontal motor 295 so as to move the transport head 20 from a position over the pan conveyor to a position over the carton conveyor.

After the cam shaft has rotated through approximately 110°, a lobe on the cam engages the normally open switch T4 causing it to close and complete a circuit to solenoid D via leads 588, 589 and 590. Energization of solenoid D moves the spool of valve 481 into a position in which air pressure is supplied to the upper side of pan stop motor 240 causing the pan stop to be moved downwardly so as to permit a new pan or a new cluster of cups in the same pan to be moved forwardly along the pan conveyor into a position beneath the transport head. Solenoid D remains energized through approximately the next 65° of rotation of the cam shaft after which the switch T4 opens de-energizing solenoid D and permitting the valve spool 481 to be moved back into its origianl position in which the motor 240 moves the pan stop upwardly into a pan engaging position.

After the cam has rotated through 50% of a cycle of rotation or in the preferred embodiment through 180°, the switch T1 is opened by the cam shaft thereby opening the original circuit to the cycle timer motor T. If there is no box or carton on the carton conveyor in a position beneath the transport head, the cycle timer motor will stop rotation of the cam shaft. Hwever, if there is a carton properly located beneath the transport head, its presence will be detected by a photoelectric control panel 592. The photoelectric control panel is illustrated diagrammatically in the circuit diagram. One suitable such panel is manufactured by General Equipment Company and is identified as No. CPR5SS–O–BC. The presence of the carton beneath the transport head will break the light circuit between the sender and receiver of the photoelectric panel closing the normally open contact CPR–1 so as to complete a circuit to the timer motor T via leads 593, 594, through the closed pan stop switch 255, via lead 595, through the normally closed blade 545 of the reset switch 515, and via leads 546 and 533. Thus, if a carton is present beneath the transport head the cycle timer motor will continue to rotate and continue the cycling of the machine. However, in the absence of a carton in this position, the machine cycling will stop with the transport head located above the carton conveyor and will remain in the position until a carton arrives at the carton loading station.

After the cam shaft has rotated through approximately 61% of a cycle of rotation or in the preferred embodiment after about 220° of rotation of the cam shaft, the normally open switch T8 will be engaged by a lobe of the cam and caused to close thereby completing a circuit to solenoid G via leads 597, 598 and 599. Energization of solenoid G moves the spool of valve 450 into a position in which the box spreader motor 354 is actuated so as to move the box spreader fingers downwardly and inwardly to open the forward and rearward sides of the box.

Simultaneously with the closing of the switch T8, the switch T5 is engaged by a lobe of the cam shaft causing this switch to close and complete a circuit to solenoid C via leads 601, 602 and 567. Energization of solenoid C again causes movement of the valve 432 into a position in which air is supplied to the top side of vertical motor 304 causing the transport head to once again move downwardly.

After the cam shaft has rotated through approximately 62% of a cycle of rotation, a lobe on the cam shaft engages the switch T6 causing it to open de-energizing solenoid E. De-energization of solenoid E causes movement of the spool of valve 480 into its original position in which the vacuum is released to the suction cups and they are supplied with air at atmospheric pressure. Thus, the rolls are released by the cups. At this time the suction cups are located immediately above the box with the rolls having been forced into the box.

After the cam shaft has rotated through approximately 77% of a cycle of rotation, the cam lobe which had been in engagement with switch T5 releases it permitting it to move into its normally open position and thus de-energizing solenoid C. De-energization of solenoid C permits the spool of valve 432 to move into its original position in which air under pressure is supplied from line 472 to the lower side of the vertical cylinder causing the transport head to be moved upwardly.

Approximately simultaneously with the opening of the switch T5, switch T8 is engaged by a cam lobe and forced into its open position so as to de-energize solenoid G. De-energization of solenoid G causes the spool of valve 450 to move into its original position so that air is supplied to the box spreader motor 354 causing it to move the box spreader fingers upwardly and out of engagement with the box.

After the cam shaft has rotated through approximately 79% of a cycle of rotation, the switch T7 is again engaged by its cam lobe and forced into the open position so as to de-energize solenoid F. De-energization of solenoid F causes the spool of valve 460 to move into its original position in which air is supplied to that end of the horizontal motor 295 which causes the motor to move the transport head back into a position over the pan conveyor.

After the cam shaft has rotated approximately 80% of a cycle of rotation, switch T2 is disengaged by a lobe of the cam permitting it to open. Opening of switch T2 opens a circuit to a time delay relay TDR. Opening of the circuit to the time delay relay TDR causes its contact TDR–1 to immediately close completing a circuit to solenoid H vias leads 605, 606 and 607. The contact TDR–1 remains closed until the capacitor of the relay has discharged through the variable resistance pot 608. So long as the contact TDR–1 remains closed, solenoid H remains energized. Energization of solenoid H causes the spool of valve 482 to be moved into a position in which air pressure is supplied to the upper side of box stop motor 240A. With air supplied to this end of the motor, the box stop is lowered so that the filled box or carton of rolls is permitted to move down the conveyor and a new box to be moved into a position beneath the transport head. As soon the the capacitor of the time delay relay TDR is discharged through the variable resistance pot 608, the contact TDR–1 opens de-energizing solenoid H. De-energization of this solenoid returns the spool of valve 482 to its original position in which air under pressure is supplied to the lower side of motor 240A causing the box stop to move upwardly onto a position in front of the box which is trailing the just loaded box. In actual practice, the pot 608 is adjusted so that the box stop will rise up against the trailing edge of the just loaded box forcing the trailing edge upwardly off of the conveyor. Since the boxes are usually fed one immediately behind the other, the stop must be raised prior to the time that the full box clears the stop.

After the cam shaft has rotated to approximately 92% of its cycle of rotation, the switch T2 is closed by the cam so as to condition it for the next cycle of operation.

If a full pan of rolls is located beneath the transport head at the unloading station on the pan conveyor, the machine will continue to cycle. If there is no pan at the pan unloading station when the transport head arrives over it, the switch 255 will be opened so that the circuit to the cycle timer motor T is opened and the cam shaft rotation will be stopped. It will remain stopped until a pan arrives into abutment with the pan stop at which time the switch 255 will close and the cycle will continue.

From the foregoing disclosure of a preferred machine for practicing this invention, those skilled in the art will readily comprehend various modifications to which the invention is susceptible. Therefore, I desire to be limited only by the scope of the following claims.

Having described my invention, I claim:

1. Apparatus for producing a package containing a multiplicity of partially baked multiple section soft dough products having grooves defined between the sections, said apparatus comprising, pan conveyor means for moving pans of said products to a pick-up station, vertically and laterally movable transport head means for removing said products from said pans and conveying them to a packing station, a plurality of suction cups mounted upon said transport head, each of said cups comprising a center tubular section, a flange extending outwardly from one end of said tubular section and defining an obtuse angle between said tubular section and said flange, said flange being made from a soft resilient material, said flange in cross-section being tapered outwardly to its lateral extremity so as to define a thin and supple peripheral edge veil of less resistance to deformation than the compressive strength of said partially baked dough products, said peripheral veil being sufficiently thin and supple that the passage of air upwardly into said cup when said veil is located in unsealed proximity to said products will cause said veil to flex and enter said grooves to form a seal with the product without distorting the surface contour of the product.

means for stopping said pans on said conveyor at a location beneath said transport head, carton conveyor means for moving empty cartons to a packing station, means for stopping said cartons at said packing station, means for moving said transport head downwardly to place said suction cups in engagement with said products, means for placing a vacuum on the interior of said suction cups, means for moving said transport head upwardly and laterally to a location over said carton conveyor while maintaining a vacuum to said cups whereby said products are removed from said pan and conveyed over said carton conveyor, means for moving said head downwardly while maintaining said vacuum to said cups to locate said products within a carton at said packing station, and means for opening the interior of said cups to at least atmospheric pressure after said products are located within said carton to release said cups from said products.

2. The apparatus of claim 1 in which the flange of each of said suction cups is made from a soft resilient material of less than 80 durometer hardness.

3. The apparatus of claim 1 which further includes movable means at said packing station to engage and fully open a carton at said packing station, said means being operable in synchronization with movement of said transport head to engage and open said carton immediately prior to insertion of said products into a carton at said packing station and movable out of engagement with said carton immediately after the products have been inserted into said carton.

4. The apparatus of claim 1 which further includes a movable box spreader means mounted upon said apparatus over said carton conveyor at said packing station to engage and fully open the sides of a carton at said packing station, said means being operable in synchronization of movement with said transport head to engage and open said carton immediately prior to insertion of said products into a carton at said packing station and movable out of engagement with said carton immediately after the products have been inserted into said carton as said transport head moves toward said pick-up station.

5. The apparatus of claim 1 in which said means for placing a vacuum on the interior of said suction cups includes a turbine having an intake port and an exhaust port, conduit means extending between said suction cups and turbine intake port, and an air nozzle connected to said turbine exhaust port, said nozzle including means to adjust the rate of air exhaust from said nozzle.

6. The apparatus of claim 1, in which said means for placing a vacuum on the interior of said suction cups includes a turbine having an air intake port and an exhaust port, conduit means between said suction cups and said turbine intake port, and an air diffuser connected to said turbine exhaust port, said diffuser including a tubular nozzle having outlet ports therein, a plug mounted within said nozzle and operative to adjustably cover said nozzle ports, a housing surrounding said nozzle and connected to said plug, said housing having a porous packing material mounted therein and operative to entrap and prevent solid material from being exhausted through said diffuser.

7. The apparatus of claim 1 which further comprises means to prevent downward movement of said head when a pan is not located at said pickup station, and means for preventing downward movement of said head at a baking station when a carton is not located at said baking station.

8. Portable apparatus for producing a package containing a multiplicity of baked dough products comprising, a frame mounted upon rollers to facilitate movement into and out of a production line, a pan conveyor mounted upon said frame for moving pans of said products to a pick-up station, transport head means mounted upon said frame for removing said products from said pans and conveying them to a packing station, a plurality of suction cups mounted upon said transport head, means for stopping said pans on said conveyor at an unloading station beneath said transport head, a carton conveyor mounted upon said frame for moving empty cartons to a packing station, means for stopping said cartons at said packing station, means including a pneumatic motor for effecting vertical movement between said transport head and said pans to place said suction cups in engagement with said products in said pans, means for applying a vacuum to the interior of said suction cups, means including a second pneumatic motor for effecting vertical movement of said head away from said pans and lateral movement to a location over said carton conveyor while maintaining a vacuum to said cups whereby said products are removed from said pan and conveyed over said carton conveyor, means for effecting vertical movement of said head relative to said carton at said packing station while maintaining said vacuum to said cups to locate said products within a carton at said packing station, means for opening the interior of said cups to at least atmospheric pressure after said products are located within said carton to release said cups from said products, pneumatic motor operated floor pads mounted upon said frame, said pads being movable between a position out of engagement with a bakery floor and into engagement with said floor to anchor said machine at the end of a production line, and means for actuating said floor pad motors and moving said pads into engagement with said floor in response to an air pressure supply being connected to said machine to supply air pressure to all of the pneumatic motors of said machine.

References Cited

UNITED STATES PATENTS

| | | | |
|---|---|---|---|
| 2,666,562 | 1/1954 | Birch | 53—247 |
| 2,713,402 | 7/1955 | Balogh | 254—86 XR |
| 2,876,603 | 3/1959 | Zawaski | 53—59 |
| 2,904,944 | 9/1959 | Notredame et al. | 53—247 XR |
| 3,300,945 | 1/1967 | Grossi et al. | 53—247 XR |
| 2,445,884 | 7/1948 | MacManus | 214—309 |
| 2,656,656 | 10/1953 | Murdoch et al. | 53—186 XR |
| 3,063,209 | 11/1962 | Neal et al. | 53—186 XR |
| 3,170,581 | 2/1965 | Temple | 214—309 |

WILLIAM W. DYER, Jr., *Primary Examiner.*

ROBERT C. RIORDON, *Examiner.*

RALPH J. ALVEY, *Assistant Examiner.*